United States Patent
Wallace et al.

(10) Patent No.: US 12,424,877 B2
(45) Date of Patent: Sep. 23, 2025

(54) CHARGING DEVICE

(71) Applicant: Lenovo (Singapore) Pte. Ltd., Singapore (SG)

(72) Inventors: Brian William Wallace, Raleigh, NC (US); Cuong Huy Truong, Cary, NC (US); Brian H. Leonard, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/420,287

(22) Filed: Jan. 23, 2024

(65) Prior Publication Data

US 2024/0162755 A1    May 16, 2024

Related U.S. Application Data

(63) Continuation of application No. 16/734,343, filed on Jan. 5, 2020, now Pat. No. 11,916,402.

(51) Int. Cl.
| | |
|---|---|
| *H01F 27/28* | (2006.01) |
| *H02J 7/00* | (2006.01) |
| *H02J 50/12* | (2016.01) |
| *H02J 50/40* | (2016.01) |
| *G06F 1/16* | (2006.01) |

(52) U.S. Cl.
CPC .............. *H02J 50/12* (2016.02); *H01F 27/28* (2013.01); *H02J 7/0042* (2013.01); *H02J 50/40* (2016.02); *G06F 1/1601* (2013.01)

(58) Field of Classification Search
CPC .......... H02J 50/12; H02J 7/0042; H02J 50/40; H02J 7/0044; H02J 7/0047; H01F 27/28; H01F 38/14; G06F 1/1601; G06F 1/1626; G06F 1/1632; G06F 1/1635; G06F 1/1683
USPC ........ 320/107, 108, 114, 115, 137, 109, 112, 320/134, 113; 307/104
See application file for complete search history.

(56) References Cited

U.S. PATENT DOCUMENTS

| | | | |
|---|---|---|---|
| 2004/0233620 A1* | 11/2004 | Doczy | G06F 1/1671 |
| | | | 361/679.15 |
| 2019/0245364 A1* | 8/2019 | Huang | H02J 50/10 |
| 2020/0091755 A1* | 3/2020 | Larsson | H02J 7/0044 |

* cited by examiner

*Primary Examiner* — Elim Ortiz
(74) *Attorney, Agent, or Firm* — Brian J. Pangrle

(57) ABSTRACT

A charging device can include a base that includes a front edge, opposing sides, a back edge, an upper surface, a lower surface, at least one charger panel slot, power transmission circuitry, a charger panel, a charger panel coil operatively coupled to the power transmission circuitry, and a foot that extends outwardly from the lower surface.

18 Claims, 17 Drawing Sheets

CHARGING DEVICE

RELATED APPLICATIONS

This application is a continuation of a pending U.S. patent application having Ser. No. 16/734,343, filed 5 Jan. 2020, which is incorporated by reference herein, which incorporate by reference a U.S. patent application having Ser. No. 16/675,975, filed 6 Nov. 2019, entitled "Slotted base display device", is incorporated by reference herein.

TECHNICAL FIELD

Subject matter disclosed herein generally relates to computing, display and charging devices.

BACKGROUND

A device can include circuitry that can provide energy for charging a rechargeable battery or batteries.

SUMMARY

A charging device can include a base that includes power transmission circuitry, a charger panel and a coil operatively coupled to the power transmission circuitry, where the charger panel includes a transparent material, and where the coil is visible via the transparent material. Various other apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
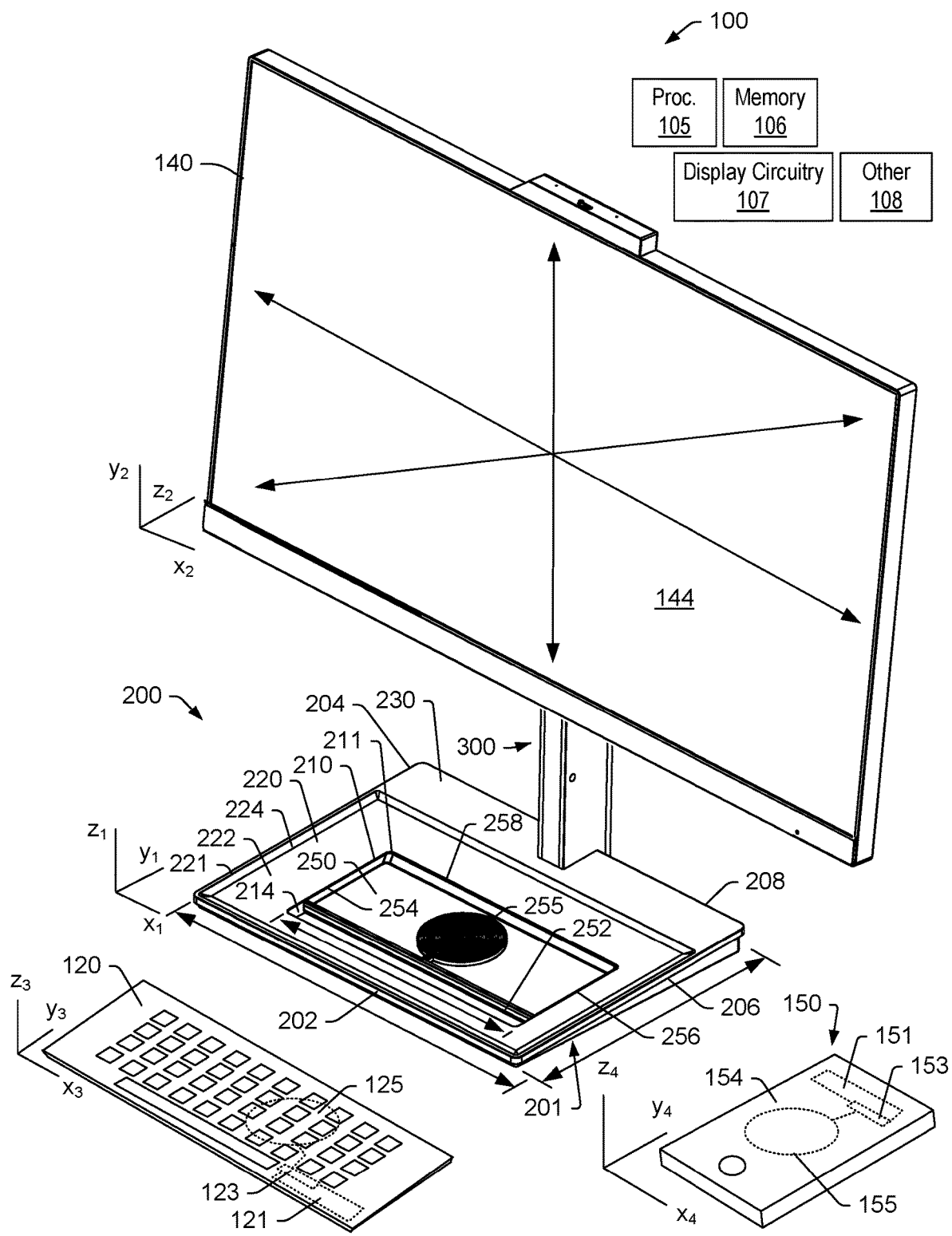
FIG. 1 is a perspective view of an example of a base, a display device and a computing device.

FIG. 1 shows an example of a computing device 100 that can include one or more processors 105, memory 106 accessible to at least one of the one or more processors 105, display circuitry 107 and one or more other components 108, which can include electronic circuitry, instructions stored in the memory 106 and executable by at least one of the one or more processors 105, etc.

As shown in FIG. 1, the computing device 100 includes a display housing 140 with a display surface 144 that may utilize one or more technologies (e.g., LED, LCD, etc.). The display circuitry 107 can be operatively coupled to at least one of the one or more processors 105, for example, to receive data, instructions, etc., for rendering text, graphics, images, etc., to the display surface 144. As an example, the display circuitry 107 can include one or more graphics processing units (GPUs) and, for example, one or more of the one or more processors 105 can be a central processing unit (CPU). As an example, the display circuitry 107 can include input circuitry such as touch circuitry, digitizer circuitry, etc., such that the display surface 144 is an input surface. For example, the display surface 144 may receive input via touch, a stylus, etc. As an example, the display housing 140 can be a housing for a touchscreen display where a finger, a stylus, etc., can be utilized; noting sensing as to input may occur with or without physical contact between a finger and the display surface 144, between a stylus and the display surface 144, etc., depending on the type of input circuitry utilized (e.g., resistive, capacitive, acoustic wave, infrared, optical, dispersive signal, etc.).

In the example of FIG. 1, the computing device 100 can include a keyboard 120, a base 200 with a charger panel 250, the display housing 140, an arm 300 that extends from the base 200 that can include an arm mount that couples the arm 300 to the display housing 140, for example, on a back side of the display housing 140 that is opposite the display surface 144 of the display housing 140.

The display surface 144 can be part of a display that includes display circuitry, which may include one or more types of touch, digitizer, etc., circuitry. The base 200, the arm 300 and the display housing 140 and/or the display surface 144 can be defined with respect to one or more coordinate systems such as, for example, one or more Cartesian coordinate systems (see, e.g., $x_1$, $y_1$, $z_1$ and $x_2$, $y_2$, $z_2$). The keyboard 120 and an another computing device (e.g., or a peripheral) 150 can be defined with respect to one or more coordinate systems such as, for example, one or more Cartesian coordinate systems (see, e.g., $x_3$, $y_3$, $z_3$ and $x_4$, $y_4$, $z_4$).

In the example of FIG. 1, the base 200 includes the charger panel 250, which can be positionable at an angle. For example, the charger panel 250 is shown in the example of FIG. 1 as being disposed at least in part in a recess 210 of the base 200 where the recess 210 has an opening 211 defined at least in part by a wall 214 of the base 200 that extends to a surface 222 of the base 200. As shown, the surface 222 can be a recessed surface of another recess 220 that has an opening 221 defined at least in part by a wall 224 that extends to an upper surface 230 of the base 200. As an example, a base may have an upper surface that includes tiered recesses or does not include tiered recesses. For example, a base may include a single recess for a charger panel 250 that can, at least in part support a computing device such as a mobile device (e.g., a smartphone, etc.).

As an example, the recess 220, which can be considered a recess tier of multiple recesses including the recess 210, may be sized to receive a keyboard such as, for example, the keyboard 120. For example, the keyboard 120 may be positioned in a storage state (e.g., a storage orientation) in the recess 220, which can cover the charger panel 250. In such an example, the keyboard 120 can include a rechargeable battery 121, charging circuitry 123 and 125 that can be electronically coupled to circuitry 255 of the charger panel 250 for charging the rechargeable battery 121. In such an example, in the storage state of the keyboard 120, the battery 121 of the keyboard 120 may have sufficient power to establish communication with one or more devices, components, etc., such that keystrokes entered via keys of the keyboard 120 can cause one or more actions of the one or more devices, components, etc. For example, the keyboard 120 may be wirelessly coupled to one or more of the one or more processors 105 and/or may be wirelessly coupled to one or more processors of the computing device 150 (e.g., or peripheral).

In the example of FIG. 1, where tiered recesses such as the recesses 210 and 220 exist, the recess 220 can be sufficient to seat the keyboard 120 such that the wall 224 can limit movement of the keyboard 120. For example, the recess 220 can be sufficiently deep (e.g., in the $z_1$ direction) to seat at least a portion of the keyboard 120 therein. For example, the keyboard 120 can include one or more feet that can contact the surface 222 and position the keyboard 120 a distance from the charger panel 250 such that the circuitry 255 can transmit energy to the circuitry 125. As an example, the dimensions of the recess 220 can be matched to one or more dimensions of the keyboard 120 such that there is sufficient alignment between the circuitry 255 and the circuitry 125 for transmission of energy. For example, consider alignment along the $x_1$ and $x_3$ directions and/or along the $y_1$ and $y_3$ directions, which can act to center the circuitry 255 and the circuitry 125.

As mentioned, in the example of FIG. 1, the charger panel 250 can be positionable at an angle. For example, the charger panel 250 can include a front edge 252, opposing sides 254 and 256 and a back edge 258 where the back edge 258 can be raised relative to the front edge 252 to dispose the charger panel 250 at an angle, for example, where the back edge 258 is a top edge and the front edge 252 is a bottom edge. For example, in FIG. 1, the angle may be approximately 0 degrees, which may be adjusted to an angle greater than approximately 0 degrees, for example, in a range from approximately 0.1 degrees to approximately 90 degrees (e.g., or more).

As an example, the charger panel 250 can be utilized to at least charge a rechargeable battery 151 of the computing device 150, which can include charging circuitry 153 and 155. As explained, the charger panel 250 can be disposed at an angle, which may make the charger panel 250 a stand that can support the computing device 150, for example, to position a display surface 154 of the computing device 150 at the particular angle, which may be a viewing angle to facilitate a user's view of the display surface 154. As an example, the base 200 can be a charging and stand base for a computing device such as a cellular phone (e.g., a smartphone, etc.). In such an example, the charger panel 250 can be an adjustable stand where an angle of the charger panel 250 is adjustable for positioning a computing device at a desired angle.

As an example, the charger panel 250 can be at least in part transparent. For example, consider a material such as glass, clear plastic, etc., where the circuitry 255 can be fixed to the material (e.g., adhered to, embedded in, recessed in, etc.) such that the circuitry 255 is visible, which may provide a clue to a user that the charger panel 250 is configured with circuitry for purposes of charging one or more types of devices (e.g., the computing device 150, a peripheral, etc.). In such an example, where the charger panel 250 is in an angled state (e.g., an angled orientation or stand orientation), the transparent material may make the charger panel 250 less obtrusive, such that overall aesthetics may support efficient and/or ergonomic workflows of a user. For example, consider a stylus that may be positioned on the base 200 behind the charger panel 250 where a user can see the stylus through the charger panel 250 where the charger panel 250 is transparent.

As an example, a transparent material can be a material that possesses physical properties that allow for transmission of rays of light therethrough such that an object situated beyond or behind the material can be seen. A transparent material can substantially follow Snell's law. As an example, a material can be transparent yet scatter light rays to some extent. As an example, a translucent material can be made up of components with different indices of refraction; whereas, a transparent material can be made up of one or more components with a uniform index of refraction. As an example, a transparent material can appear clear, with an overall appearance of one color, or any combination of colors. The opposite property of translucency is opacity (e.g., an opaque material).

As an example, the charger panel 250 can be colored (e.g., tinted). As an example, the charger panel 250 can be made of a material that acts as a light guide. For example, consider one or more light emitting diodes (LEDs) being positioned proximate to the charger panel 250 or optionally within the charger panel 250. In such an example, illumination of an LED or LEDs may cause the charger panel 250 to glow. As an example, where color, brightness, etc., can be controllable, circuitry can provide for selectably illuminating the charger panel 250 using a color, a brightness, etc., which may provide a visual cue to a user as to a status. For example, where a rechargeable battery of a computing device is charged using the circuitry 255 of the charger panel 250, the charger panel 250 can be selectably illuminated. For example, consider a soft glow of a rising intensity that tapers off to a lesser intensity such as to not distract a user that may be viewing information rendered to the display surface 144, etc. In such an example, the duration of the illumination (e.g., or illumination effect as a visual cue) may optionally be tailored such that it is sufficient to provide a visual cue while not being undesirably distracting to a user. As an example, consider an illumination effect that indicates when a rechargeable battery being charged via the charger panel 250 is completely charged (e.g., to a level as may be determined by charging circuitry, etc.).

Referring again to FIG. 1, as shown, the charger panel 250 can be defined by a surface area such as using x and y dimensions, where a thickness of the charger panel 250 may be defined using a z dimension. In the example of FIG. 1, the charger panel 250 is smaller in dimensions than the base 200 as the charger panel 250 substantially fits within the recess 210 of the base 200. As shown, the base 200 has larger dimensions than the charger panel 250 as the base 200 supports the arm 300 and the display housing 140, which can include additional circuitry (e.g., consider the display housing 140 as being part of an all-in-one (AIO) computing device).

In the example of FIG. 1, the base 200 has a front edge 202, opposing sides 204 and 206 and a back edge 208. As shown, the upper surface 230 of the base 200 can be sloped such that the back edge 208 is at a greater height (see, e.g., $z_1$) than the front edge 202. Such a slope may be at an angle that is less than approximately 80 degrees. For example, consider a slope of approximately 10 degrees. As an example, the surface 222 may be sloped or may be non-sloped. In the example of FIG. 1, the surface 230 forms a ring around the opening 221, which frames the recess 220; noting that the surface 222 can frame the opening 211.

As an example, the base 200 may be defined by a footprint where the footprint can be an area occupied by the base 200 when disposed on a surface such as a desktop, a tabletop, a countertop, etc. As an example, the base 200 may be a platform where, for example, the device 100 is supported on a pole, etc. For example, the device 100 may be a kiosk device that has clean aesthetics where the base 200 is positioned a distance from a floor of a room where, for example, a user may position a smartphone using the base 200 for one or more purposes (e.g., charging, interacting with the device 100, supporting at a viewing angle, etc.).

In the example of FIG. 1, the arm 300 rises from a position at the back edge 208 of the base 200; noting that a multi-arm configuration may be utilized where, for example, two or more arms are coupled to the base 200 to support one or more displays, etc. As shown, the arm 300 is substantially normal to a plane defined by the base 200 such as a plane defined by a lower surface 201 of the base 200, which may include one or more feet, etc., that can contact a support surface.

As an example, the arm 300 may provide for adjusting height of the display housing 140 and/or for tilting the display housing 140. In such examples, a user may adjust the display surface 144 to achieve a desired viewing angle, field of view, etc. As an example, where the computing device 150 is supported by the charger panel 250, it may be set at a desired angle such that the user may readily view both the display surface 144 and the display surface 154.

As an example, a user may have a viewing zone that can be defined by limits such as an upper limit that corresponds to an angle of zero degrees and a lower limit that is measured downwardly from the upper limit. As an example, the viewing zone may have an optimal range of angles where, for example, the optimal range has a lower limit.

As an example, an optimal viewing angle for eyes may be defined according to the International Standards Organization (ISO ergonomics standards 9241-5). ISO 9241-5 states that an optimal viewing angle, or resting angle, is a −35 degree downward gaze angle from the horizon (e.g., at the level of the eyes). ISO 9241-5 also states that the optimal display placement is in a range of +/−15 degrees from the resting angle (e.g., −20 degrees to −50 degrees). Using the ISO 9241-5, a display surface may be optimally placed to be in a range of −20 degrees to −50 degrees relative to the horizon. The ISO 9241-5 range tends to be a bit lower than most users are accustomed for computer work, but is near a "normal" reading position as used by humans for many years. In this "normal" reading position, a display surface may be more appropriately called chest-height rather than head-height.

As to specific upper and lower limits of ISO 9241-5, it allows for a 0 degree horizontal gaze down to a −60 degrees gaze angle; noting that the lower limit of −60 degree angle may result in some amount of neck strain.

Figure 2:
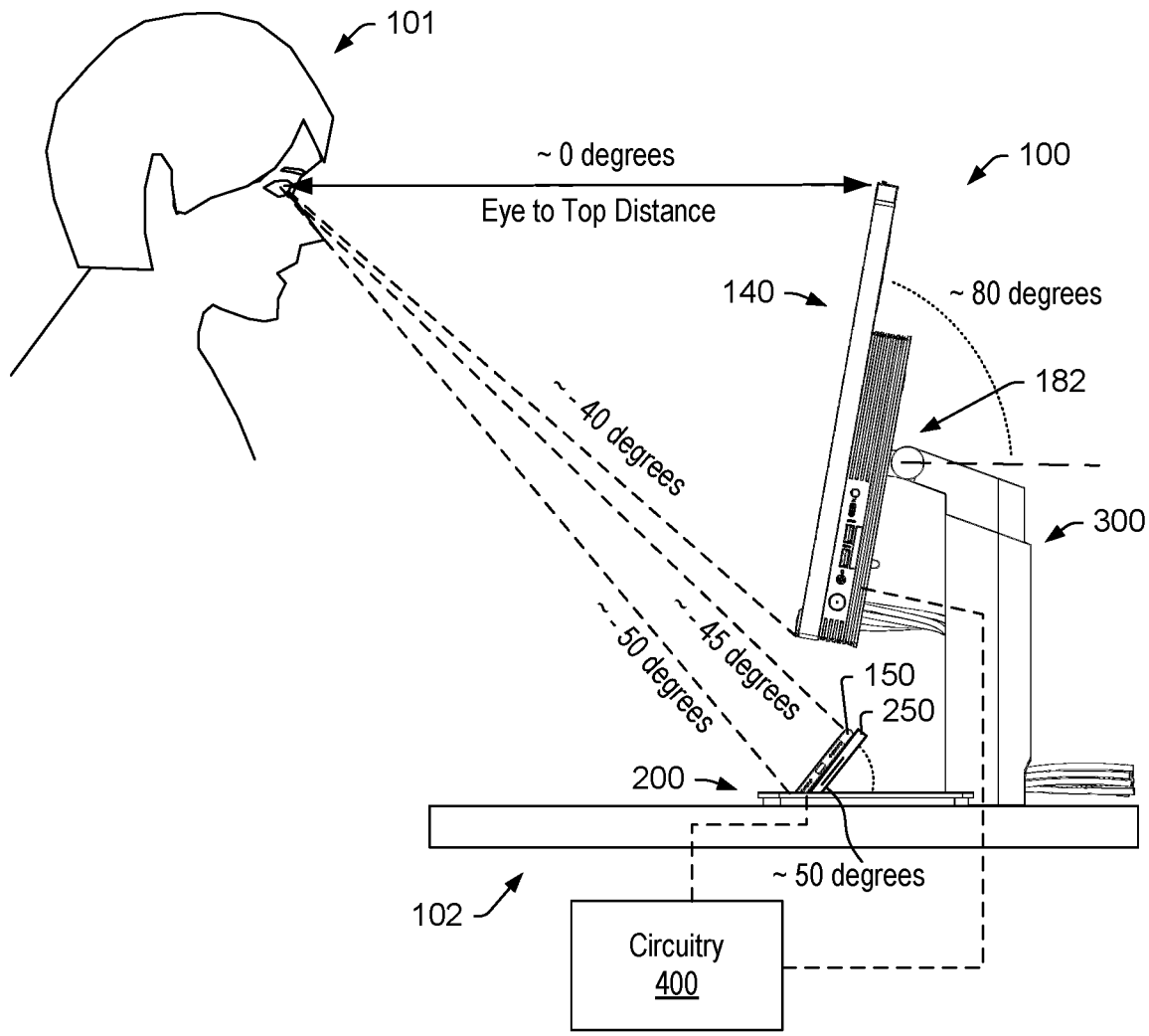
FIG. 2 is a side view of an example of the base, the display device and the computing device of FIG. 1.

FIG. 2 shows a side view of the device 100 with respect to a user 101 and a support surface 102. The position of the user 101 is given as an example, noting that a user may be positioned closer, further, higher or lower than the user 101 with respect to the device 100 and/or the support surface 102 may be positioned closer, further, higher or lower that the position shown with reference to the user 101.

In the example of FIG. 2, the display surface 144 of the display housing 140 is at an angle of approximately 100 degrees with respect to horizontal (see, e.g., angle of approximately 80 degrees as measured to the back side of the display housing 140) and the display surface 154 of the computing device 150 as supported by the charger panel 250 is at an angle of approximately 130 degrees with respect to horizontal (see, e.g., angle of approximately 50 degrees as measured to the back side of the computing device 150); thus, the angle of the display surface 154 of the computing device 150 can be greater than the angle of the display surface 144 of the display housing 140. As an example, the display housing 140 can be adjustable via the arm 300, for example, via an arm mount 182 such that the angle may be adjusted. As shown in the example of FIG. 2, the arm 300 is at approximately 90 degrees (e.g., normal to the support surface 102).

As to the user 101, various examples of view angles are illustrated, which include a range from approximately 0 degrees to approximately −40 degrees for the display surface 144 and a range from approximately −45 degrees to approximately −50 degrees for the display surface 154 of the computing device 150. In the example of FIG. 2, both display surfaces 144 and 154 may be considered to be within the range of 0 degrees to −60 degrees of the aforementioned ISO 9241-5 specifications.

As an example, a system may be a commercial system that is utilized at a customer service station such as a bank customer service station, a hotel customer service station, a store customer service station, etc. (e.g., consider a kiosk, etc.). Such a system may provide a clean visual experience for a user and a customer. Such a system may provide for clean aesthetic design of the customer service station such that one or more cables do not occupy space on a support surface or occupy minimal space. In such an example, a transaction may occur without annoyance of cable clutter when a user is handing a receipt, a pen, etc., to the customer and/or when the customer is handing a credit card, a smartphone, a smart card, etc., to the user.

Figure 4:
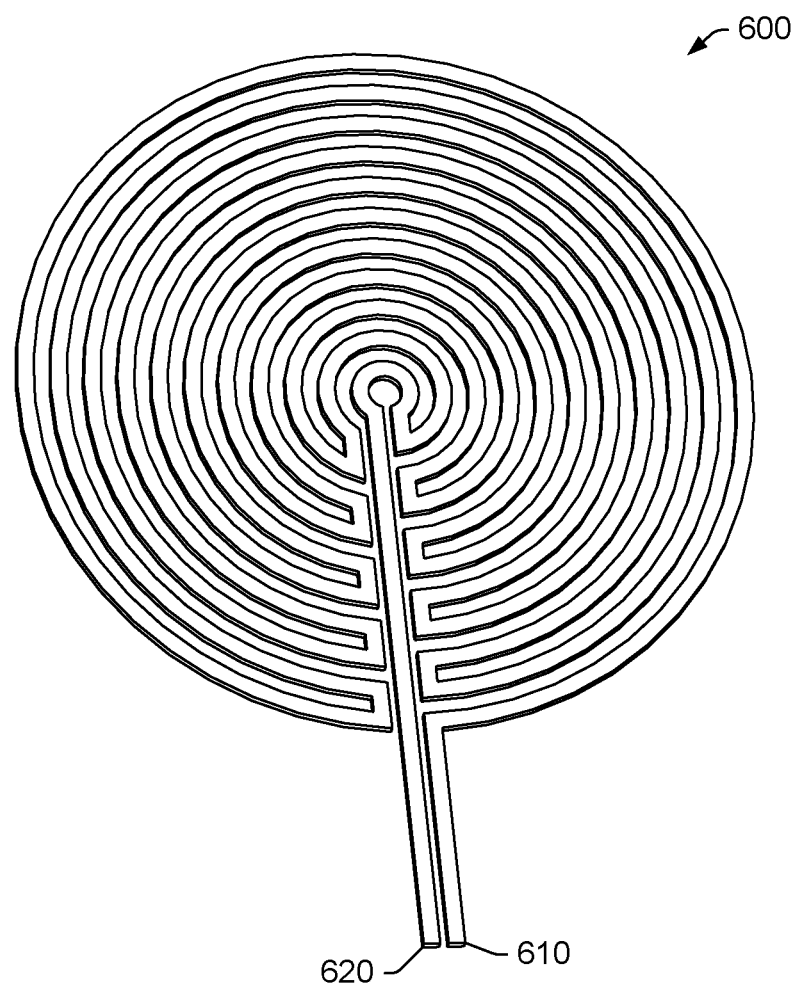
FIG. 4 is a perspective view of an example of a coil.

As shown in FIG. 2, circuitry 400 can be included that can operatively couple the computing device 150 and the device 100. For example, consider an electronic payment reader that includes circuitry that can receive payment information from the computing device 150 and/or that may transmit payment information to the computing device 150. As an example, electronic payment circuitry can be coupled to a housing and/or a stand where the electronic payment circuitry includes transmission and/or reception circuitry that can transmit payment information to a computing device disposed at least in part in a slot of a base of the stand and/or that can receive payment information from a computing device disposed at least in part in a slot of a base of the stand. As an example, the circuitry 400 may include one or more lights such as one or more light emitting diodes (LEDs), which, as mentioned, may be utilized to provide one or more signals as to the operation of charging circuitry. As mentioned, the charger panel 250 can include one or more components that may act as a waveguide or otherwise illuminate when exposed to radiation (e.g., from one or more LEDs). As an example, a component of a charger panel 250 can be touch-sensitive such that a finger touch may be utilized to input a control instruction, etc. For example, consider a touch-sensitive surface such as that of a touch-screen display where a user may commence charging, halt charging, turn off a light, etc. In the example of FIG. 4, the circuitry 400 can include one or more types of circuitry for one or more types of functions.

Figure 3:
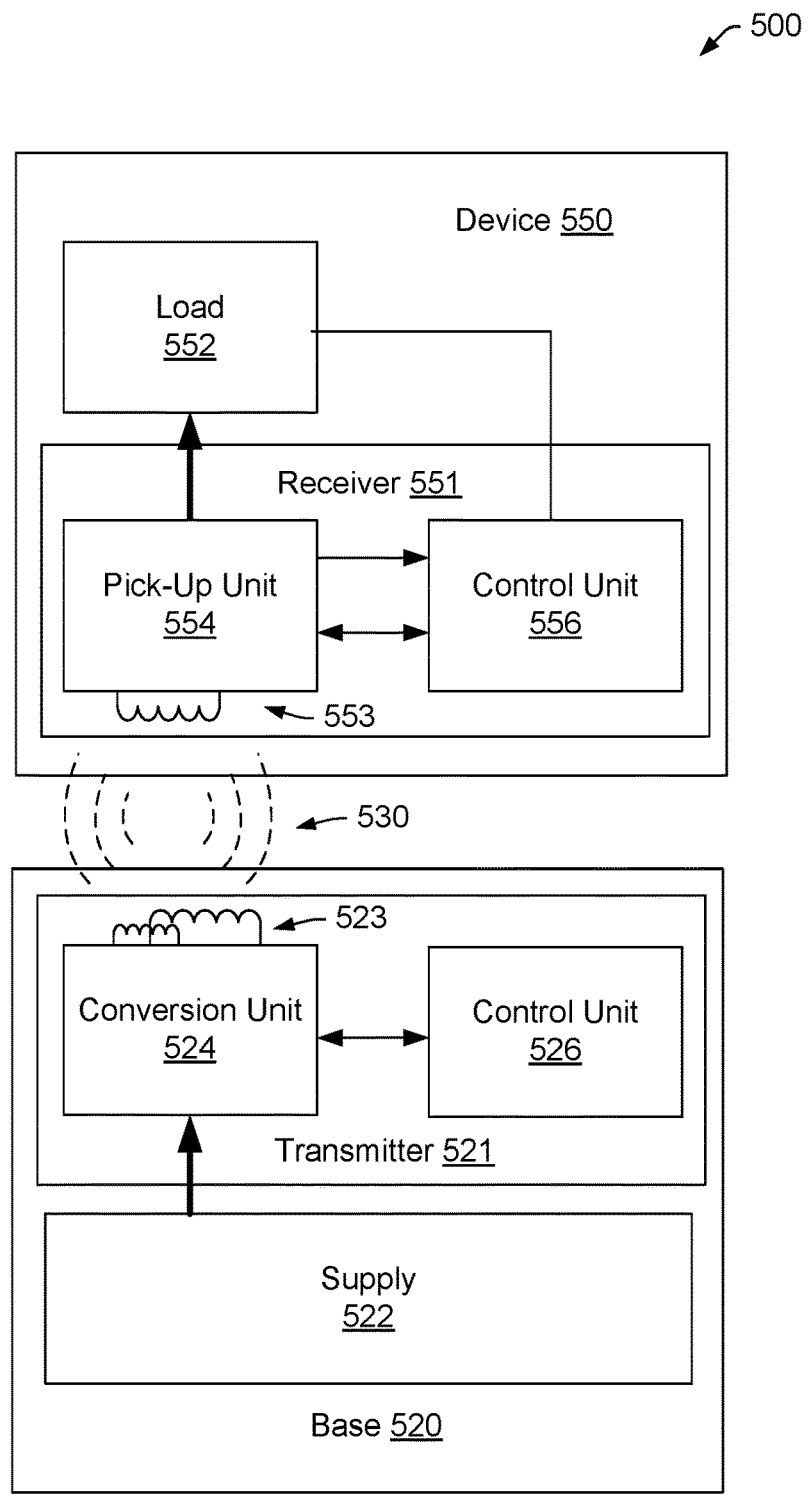
FIG. 3 is a block diagram of an example of a charging system.

FIG. 3 shows an example of a system 500 that includes a base 520 and a device 550 where the base 520 can transmit energy to the device 550, for example, to power the device 550, to store power in a battery of the device 550, etc.

As an example, the base 520 and/or the device 550 may operate according to one or more standards where compatibility exists such that energy can be transmitted from the base 520 to the device 550. As an example, consider the Qi standard. Devices that operate according to the Qi standard utilize electromagnetic induction between coils, which can be planar coils. A Qi system includes two types of devices, a base (e.g., a base station), which includes or is connected to a power source and provides inductive power, and a device such as, for example, a mobile device (e.g., a mobile phone, a mobile peripheral, etc.), which can consume inductive power provided by the base.

As shown in FIG. 3, the base 520 can include a power transmitter 521 that receives power from a supply 522 where the power transmitter 521 can include one or more transmitting coils 523 that generate an oscillating magnetic field 530 in a space. In the example of FIG. 3, the supply 522 may be coupled to a wall outlet electrically coupled to a power grid, a generator, etc. As an example, converter circuitry may be included as part of the base 520 or separately that can convert AC power to DC power, at a level sufficient for operation of the base 520. As an example, a cable can be provided that can electrically connect the base 520 to a source of electrical power (e.g., AC, DC, AC and/or DC, etc.). As shown, the device 550 can include a power receiver 551 that includes a receiving coil 553. In the example of FIG. 3, the magnetic field 530 can induce an alternating current in the receiving coil 553 by Faraday's law of induction. Where there is sufficiently close spacing of the coils 523 and 553 (e.g., and sufficient shielding on their surfaces), inductive power can be transferred efficiently from the base 520 to the device 550.

As an example, a base can include a relatively flat surface (e.g., a planar surface), which may be referred to as an interface surface where a user can place the device 550 adjacent to the surface. As to alignment of the coils 523 and 553, one technique involves guided positioning where the device 550 is placed at a certain location of the base 520. In such an example, the device 550 can provide an alignment aid that can be appropriate to its size, shape and function. Another technique can be referred to as free positioning, which does not demand placement of the device 550 with direct alignment as to the position of a transmitting coil (see, e.g., the one or more coils 523, the circuitry 255, etc.). As to free positioning, a bundle of transmitting coils may be included in a base to generate a magnetic field at a location of a receiving coil or, for example, mechanical features may move one or more transmitting coils with respect to a receiving coil or, for example, a technique involving multiple cooperative flux generators may be utilized.

Referring again to FIG. 3, the system 500 includes the power transmitter 521 with a power conversion unit 524 and a communications and control unit 526. The control and communications unit 526 can regulate transferred power to a level that a power receiver requests. While the base 520 is shown with a single transmitter, a base may include multiple transmitters (e.g., for multiple devices to be placed and inductively charged). In the system 500, the base 520 may include features for input power provisioning, user interfacing, etc.

As to the power receiver 551, it can include a power pick-up unit 554 and a communications and control unit 556. As shown, the receiving coil 553 can interact with the magnetic field 530 such that energy is transferred to the power pick-up unit 554. The communications and control unit 556 can regulate transferred power to a level that is appropriate for the device 550, for example, as illustrated by the load 552, which may be circuitry associated with one or more batteries (see, e.g., the batteries 121, 151, etc.) electrically connected to the output of the power receiver 551.

As an example from the 2017 version 1.2.2 of the Qi specification, the A2 reference Qi low-power transmitter has a coil of 20 turns (in two layers) in a flat coil, wound on a form with a 19 mm inner diameter and a 40 mm outer diameter, with a below-coil shield of soft iron at least 4 mm larger in diameter which gives an inductance of 24+/−1 microhenries. This coil is placed in a series resonant circuit with a 200 nF capacitor to yield a resonant circuit with a natural resonance at approximately 140 kHz when coupled to a receiver coil. This series resonant circuit is then driven by an H-bridge switching arrangement from a DC source; at full power, the voltage in the capacitor can reach 50 volts. Power control can be automatic; the Qi specification demands that actual voltage applied be controllable in steps at least as small as 50 millivolts. Rather than down-regulating the charging voltage in a device, a Qi specification charger meets the A2 reference using a PID (proportional-integral-derivative) controller to modulate delivered power according to a primary cell voltage.

Various types of Qi charge transmitters can start their connections at 140 kHz and change frequencies to find a frequency with a better match, as the mutual inductance between transmitter and receiver coils can vary according to standoff distance between transmitter and receiver coils, and thus the natural resonance frequency can vary. Various different Qi reference designs can include different coil arrangements, including oval coil and multi-coil systems as well as more complex resonance networks with multiple inductors and capacitors. Such designs may allow for frequency-agile operation at frequencies over a range, for example, from 105 to 205 kHz and with maximum resonant circuit voltages as high as, for example, 200 volts.

The Qi specification power receiver hardware reference design 1, from version 1.2.2 of the Qi specification, has a rectangular coil of wire 44 mm×30 mm outside size, with 14 turns of wire, and with an above-coil magnetic shield. This coil is wired into a parallel resonant circuit with a pair of capacitors (e.g., of 127 nanofarads and 1.6 nanofarads in series). The power output can be taken across the 1.6 nanofarad capacitor. To provide a digital communications channel back to the power transmitter, a resonance modulator that includes a pair of 22 nanofarad capacitors and a 10 kΩ resistor in a T configuration can be switched across the 1.6 nanofarad capacitor. Switching the T network across the 1.6 nanofarad capacitor can cause a change in the resonant frequency of the coupled system that is detected by the power transmitter as a change in the delivered power. Power output to a mobile device can be via a full-wave bridge wired across the 1.6 nanofarad capacitor; the power may be filtered, for example, with a 20 microfarad capacitor before delivery to a charge controller.

Various other types of Qi power receivers may use alternate resonance modulators, including switching a resistor or pair of resistors across the receiver resonator capacitor, both before and after the bridge rectifier.

FIG. 4 shows an example of circuitry 600 that can be base circuitry and included in a base such as the base 200 of FIG. 1, the base 200 of FIG. 2, the base 520 of FIG. 3, etc. The circuitry 600 can be a coil or coils and can include one or more conductors. As an example, the circuitry 600 can be a single coil that includes a single conductor that forms a pattern, which may be defined by various dimensions such as, for example, a diameter or diameters, a radius or radii, etc. As an example, a pattern may be defined using a polygon (e.g., a square, a rectangle, etc.). As an example, a pattern can be defined using one or more curves (e.g., an arc, a circle, an ellipse, etc.).

In the example of FIG. 4, the circuitry 600 includes ends 610 and 620, which can be, for example, electrical contacts for operatively coupling the circuitry 600 to other circuitry (see, e.g., the conversion unit 524 of the transmitter 521 of the base 520 of FIG. 3).

As an example, the circuitry 600 can be colored with one or more colors. For example, consider a metallic color such as silver, bronze, copper, gold, etc. Other examples may include colors such as those of an RGB color model (e.g., black, red, yellow, etc.). When the circuitry 600 is disposed in a transparent charger panel, it can be visible as a visual cue as to the functionality of a charger panel.

Figure 5:
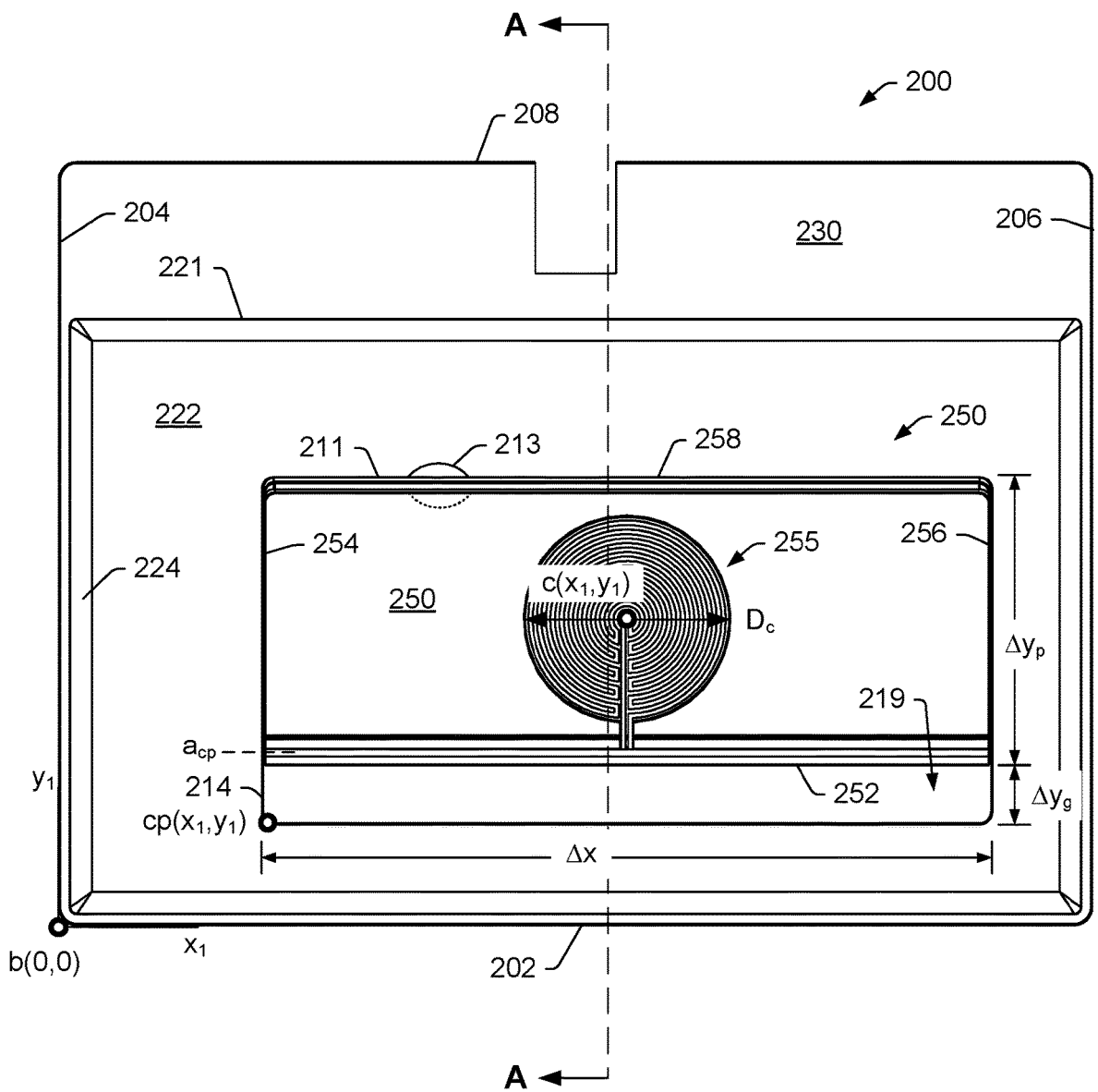
FIG. 5 is a plan view of an example of a base.

FIG. 5 shows a plan view of the base 200 of FIG. 1 with respect to coordinates associated with an $x_1$, $y_1$ coordinate system, which can have an origin as b(0,0), which may be used to reference one or more other points such as, for example, the opening 211 for the charger panel 250 at a lower left corner $cp(x_1,y_1)$ and, for example, a center point of the circuitry 255 $c(x_1,y_1)$. As shown, the circuitry 255 includes a substantially circular pattern that can be defined by a dimension $D_c$ (e.g., a diameter) with a center at $c(x_1,y_1)$. As an example, a diameter, such as $D_c$, may be greater than approximately 10 mm and less than approximately 100 mm. As an example, the diameter $D_c$ may be approximately 35 mm to approximately 50 mm.

In the example of FIG. 5, dimensions as to the opening 211 are shown, including $\Delta y_p$, $\Delta y_g$ and $\Delta x$, which can be a charger panel dimension, a gap dimension of a gap 219 between the front edge 252 of the charger panel 250 and a front edge of the opening 211, and a width of the opening 211, where a width of the charger panel 250 can be slightly less than that of the opening 211 to allow for movement (e.g., a clearance of the order of several centimeters or less, less than a millimeter, etc.).

In the example of FIG. 5, the gap 219 may be bottomless or include a bottom. For example, a bottomless gap can be defined in part by an opening in the lower surface 201 of the base 200. As shown, the gap 219 can include a long dimension as $\Delta x$ and a shorter dimension as $\Delta y_g$, along with a depth (e.g., along a direction of a $z_1$-axis). In such an example, the dimension $\Delta y_g$ may be constant or may change in a manner that depends on the position of the charger panel 250. As an example, the gap 219 can be dimensioned to receive at least a portion of a computing device such as the computing device 150, which, as mentioned, can be a smartphone. In various examples, the charger panel 250 is shown as having a length in a direction of the $x_1$-axis that is longer than a length in a direction of the $y_1$-axis, where such lengths can define an aspect ratio. As an example, the charger panel 250 may be of an aspect ratio that is unity (e.g., square, etc.) or with the $y_1$-axis direction length longer than the $x_1$-axis direction length. As an example, a substantially rectangular smartphone may be receivable in a gap in a landscape orientation or in a portrait orientation and may be chargeable in either orientation, for example, depending on sufficient alignment of circuitry, etc.

As shown in the example of FIG. 5, the charger panel 250 may pivot with respect to an axis, labeled $a_{cp}$. For example, a user may position the charger panel 250 by pivoting it a desired angle about the axis $a_{cp}$. In the example of FIG. 5, the surface 222 can include a recess 213 adjacent to the opening 211 that can allow for a finger (e.g., a finger nail, etc.) to contact the upper edge 258 of the charger panel 250 for purposes of positioning the charger panel 250. While the example of FIG. 5 shows a recess in the surface 222, as an example, a recess or recesses may be provided in the charger panel 250 (see, e.g., dotted line), alternatively or additionally. As an example, the charger panel 250 may be spring-biased such that a push downwardly on the charger panel 250 causes the charger panel 250 to lift via spring action such that one of the edges 254, 256 or 258 can be contacted with a finger to position the charger panel 250 (e.g., to pivot the charger panel 250 about the axis $a_{cp}$).

Figure 6:
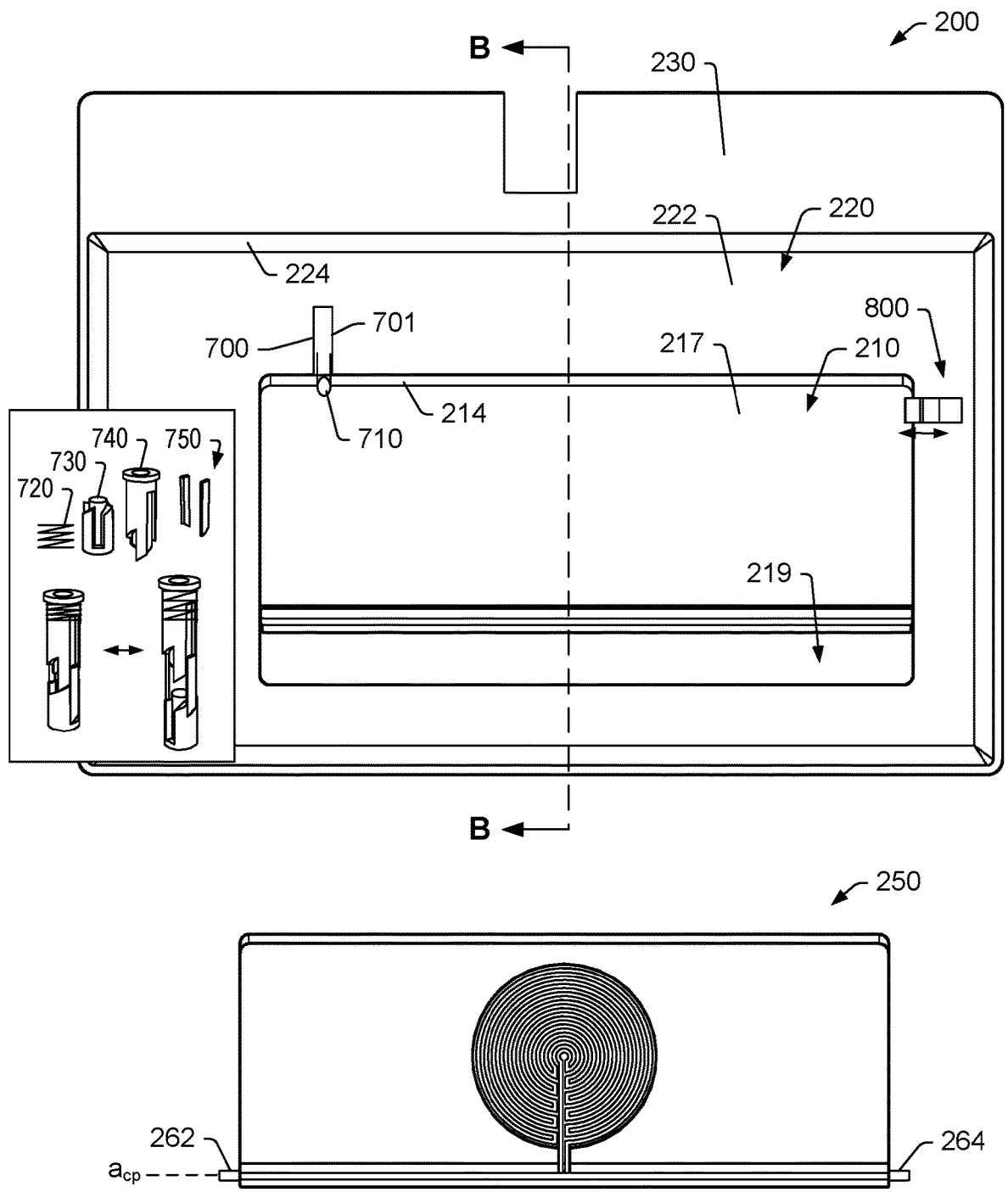
FIG. 6 is an exploded plan view of the base of FIG. 5.

FIG. 6 shows plan views of the base 200 with the charger panel 250 separated from the base 200. FIG. 6 shows the base 200 as being tiered with the recesses 220 and 210 where the surface 222 is recessed with respect to the surface 230 and where the recess 210 may include a surface 217. As mentioned, the gap 219 may be bottomless or include a bottom surface. As shown, the wall 214 defines at least a portion of the recess 210 where the wall 214 can be a substantially vertical wall along one or more portions and/or may be a sloped wall along one or more portions. As shown, the recess 222 can be defined at least in part by the wall 224, where the wall 224 can be a substantially vertical wall along one or more portions and/or may be a sloped wall along one or more portions.

As shown, the charger panel 250 can include axles 262 and 264 that define the axis $a_{cp}$. The base 200 can include sockets (e.g., bores) that can receive at least a portion of each of the axles 262 and 264 to pivotably support the charger panel 250 about the axis $a_{cp}$. As an example, the base 200 can include one or more axles and/or the charger panel 250 can include one or more axles where the charger panel 250 can include one or more corresponding sockets (e.g., bores) and/or the base 200 can include one or more corresponding sockets (e.g., bores).

As an example, one or more electrical connections can be made via a joint such as an axle and socket (e.g., bore) joint. For example, the circuitry 255 can be electrically coupled to one or more conductors that pass to a joint or joints. For example, an axle can include a conductor and a socket can include a conductor where the conductors contact for purposes of at least power for emission by a coil or coils of the circuitry 255.

As an example, a joint can be a friction joint where friction is sufficient to position the charger panel 250 at a desired angle with a computing device or other peripheral supported at least in part by the charger panel 250. In such an example, a user may position the charger panel 250 at a desired angle by applying force sufficient to overcome the friction where friction at a joint or joints can be sufficient to support a device.

FIG. 6 also shows an example of a pop out mechanism 700, which can include a bore 701, a shaft 710, a spring 720 (e.g., or springs), a cam body 730, a plunger 740 and stop members 750. As an example, the pop out mechanism may be for a spring-biased pop out adjuster that can adjust the charger panel 250 to a position that facilitates further adjustment to a desired angle. While the example of FIG. 6 shows the spring 720 to facilitate movement, one or more other springs may be included. For example, consider one or more torsion springs at a joint (e.g., at an axle and bore joint) and/or, for example, a spring or springs that may be at the surface 217 to push the charger panel 250 upon release (e.g., via a mechanical latch, etc.). As an example, consider a latch 800 that can be maneuvered by a user from a latched position (e.g., as shown) to an unlatched position. In the latched position, the charger panel 250 can be secured in the recess 210 while in the unlatched position, the charger panel 250, if spring-biased, may pop out a distance (e.g., pivot an angle) to facilitate further adjustment to a desired angle. In such an example, spring-biasing can be via a torsion spring at a joint, a spring set in the recess 210, etc., and provide for pop out adjustment and optionally locking (e.g., latching, etc.).

As shown, the axial distance between the cam body 730 and the plunger 740 can change such that the shaft 710 can transition to an extended state responsive to pressure that cause the shaft 710 to first travel axially inwardly, for example, akin to the push button of a click pen; noting that fewer features may be suitable as the push button actions is replicated for pop out of the charger panel 250 (e.g., no pen tip extension, retraction is required as in the click pen). As an example, a pop out mechanism that includes features such as a pop out mechanism for cabinets and/or drawer doors may be utilized. As an example, as to the pop out mechanism 700, the plunger 740 can be in a state with the spring 720 compressed where further compression causes the cam body 730 to rotate with respect to the plunger 740. As an example, the cam body 730 can be supported by a spring that causes contact of the cam body 730 with the plunger 740 and/or the stop members 750. As an example, the shaft 710 and the plunger 740 may be separate components or a unitary piece. As an example, the shaft 710 can include a beveled end and the charger panel 250 can include a bevel at the back edge 258 such that extension of the shaft 710 axially cause the charger panel 250 to rise (e.g., pivot the back edge 258 upwardly).

In such an example, a user may push downwardly on the charger panel 250 and then release the pressure to cause the shaft 710 to translate axially to apply pressure on the charger panel 250 to cause the charger panel 250 to pop out a distance from the recess, which can be a distance sufficient to allow a user to manipulate the charger panel 250 to a desired angle (e.g., via friction at the axles 262 and 264, etc.).

As an example, one or more axles, bores, etc., may include features that can be utilized to set an angle, to support the charger panel 250 at an angle, etc. For example, consider a ratchet mechanism, which may be releasable by manipulating the charger panel 250. As another example, the base 200 can include a support member, which may extend from the base 200 or a back side of the charger panel 250, for example, to form a triangle. In such an example, the recess 210 and/or the charger panel 250 can include ridges that can interlock with the support member to configure the charger panel 250 at a desired angle.

Figure 7:
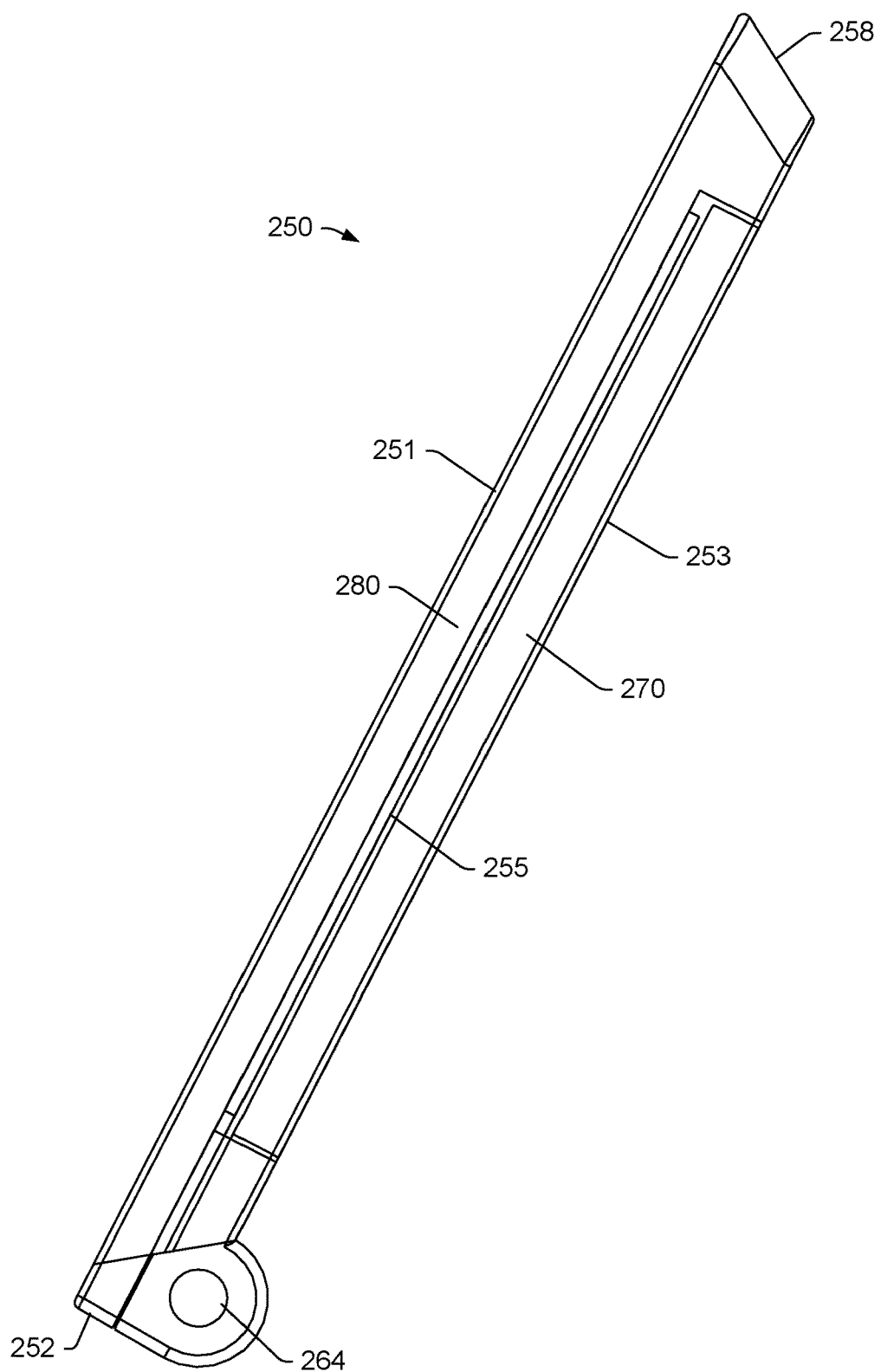
FIG. 7 is a side view of an example of a charger panel.

FIG. 7 shows a side view of the charger panel 250 as including a back piece 270, a front piece 280 and at least a portion of the circuitry 255 disposed therebetween. When recessed and substantially horizontal (e.g., at approximately 0 degrees, etc.), the back piece 270 can be downwardly facing and the front piece 280 can be upwardly facing. As mentioned, when angled out of the recess 210, the back edge 258 can be a top edge (e.g., a top side) and the front edge 252 can be a bottom edge (e.g., a bottom side).

As shown, the back piece 270 defines a back surface 253 (e.g., a back side) and the front piece 280 defines a front surface 251 (e.g., a front side). FIG. 7 also shows the axle 264, which is shown as a left side axle in the view of FIG. 6. As mentioned, material can be transparent. For example, the back piece 270 and the front piece 280 can be transparent such that the charger panel 250 is see-through where the portion of the circuitry 255 (e.g., coil or coils) can be visible (e.g., made of a material that is not see-through, an opaque material, etc.). As mentioned, the circuitry 255 can include colored circuitry (e.g., a metallic color, a non-metallic color, etc.), which may provide a visual cue as to function of the charger panel 250.

Figure 8:
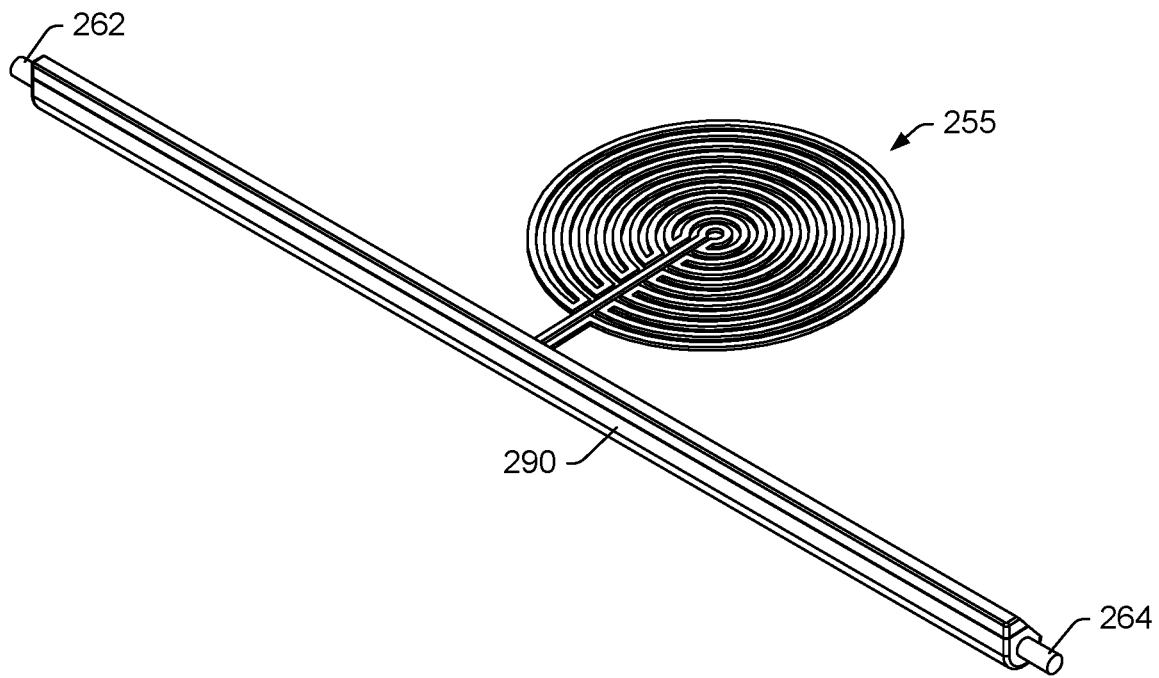
FIG. 8 is a perspective view of an example of a portion of a charger panel.

FIG. 8 shows a perspective view of an example of a subassembly of the charger panel 250 where the subassembly includes the circuitry 255 and a rod 290 where the rod 290 has opposing ends from which the axles 262 and 264 extend. As an example, the subassembly may be assembled with the back piece 270 and the front piece 280 to form the charger panel 250, which can be operatively coupled to transmitter circuitry such as, for example, that of the transmitter 521 of FIG. 5, etc.

Figure 9A:
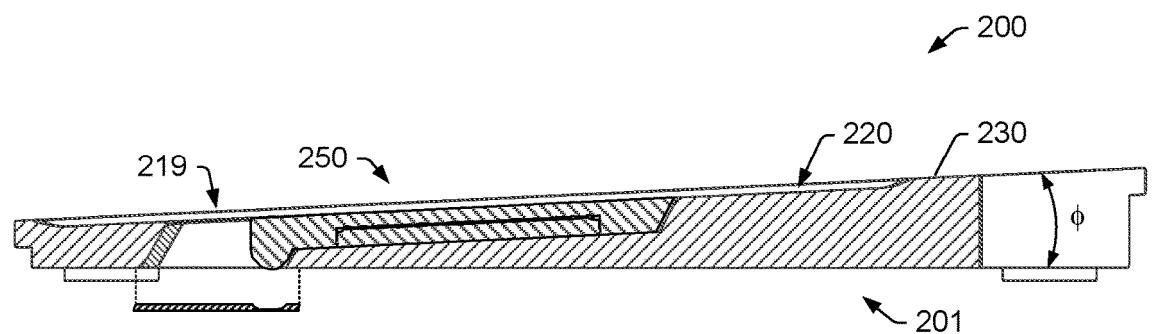
FIGS. 9A and 9B are cross-sectional views of an example of a base.
Figure 9B:
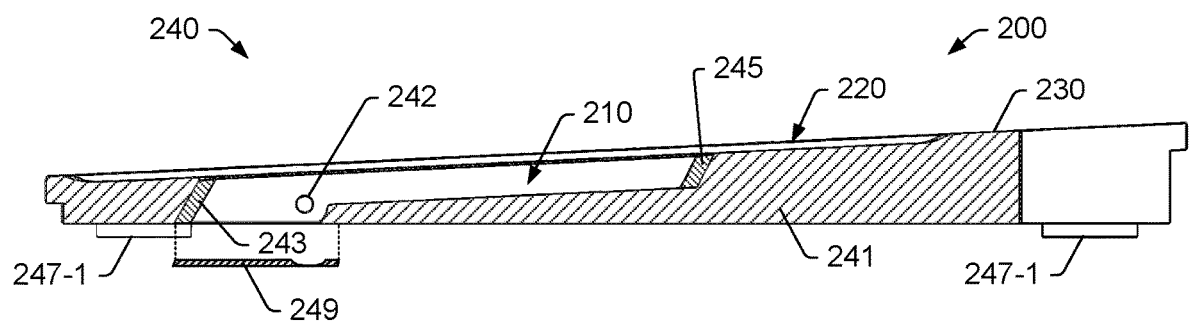

FIG. 9A and FIG. 9B show cross-sectional views of the base 200 along a plane defined by a line A-A as in FIG. 5 and along a plane defined by a line B-B as in FIG. 6. In FIG. 9A and FIG. 9B, the base 200 is shown as including a base assembly 240 that can receive the charger panel 250. As shown, the base 200 can include a body 241, a socket 242 (e.g., a bore, etc.), an optional bumper 243, an optional bumper 245, one or more feet 247-1 and 247-2 and an optional bottom wall 249, which may be part of the body 241, a separate piece, etc., with a surface that faces into the recess 210 that can support at least a portion of mass of a device where the device may be a mobile device such as a smartphone, etc. As to the bottom wall 249, it may form a bottom surface of the gap 219, which as mentioned, can be bottomless or have a bottom.

As mentioned, the base 200 may include the upper surface 230 disposed at an angle such as an angle φ. As an example, the charger panel 250 can be seated in the base assembly 240 with the front piece 280 being substantially planar and at the angle φ. As an example, the angle φ may be measured between the lower surface 201 and another surface of the base 200 (e.g., the surface 230, the surface 222, etc.

As an example, a device may be supportable in the recess 210 of the base 200 with the charger panel 250 in a seated state as shown in FIG. 9A. For example, a device may be supportable in a gap that is between the front edge 252 of the charger panel 250 and a front wall surface. As shown in the example of FIG. 9A and FIG. 9B, the front wall surface may optionally be formed of a material that can be resilient such as, for example, a rubber (e.g., synthetic and/or natural), etc. For example, the bumper 243 can be an elastomer that forms a front wall surface that is angled in a direction from front to back, which may be an angle that can be utilized for supporting a device such as, for example, the computing device 150 of FIG. 1.

As to the optional bumper 245, it may be an elastomer that can be deformable to provide a snug fit of the charger panel 250 in the recess 210. As an example, where included, the bumper 243 and/or the bumper 245 can be one or more inserts that can be inserted at least in part into the recess 210 and firmly held in place with respect to the body 241 of the base assembly 240. As an example, a bumper material may be provided as rim about a portion of the charger panel 250.

As an example, a material, such as a bumper material, may be colored and/or textured for one or more purposes. For example, consider a red color where the base 200 is a different color such as grey, black, etc. In such an example, the red color may provide a visual cue to a user that there is a feature present that can be utilized for one or more purposes (e.g., charging, supporting, charging and supporting, etc.).

Figure 10A:
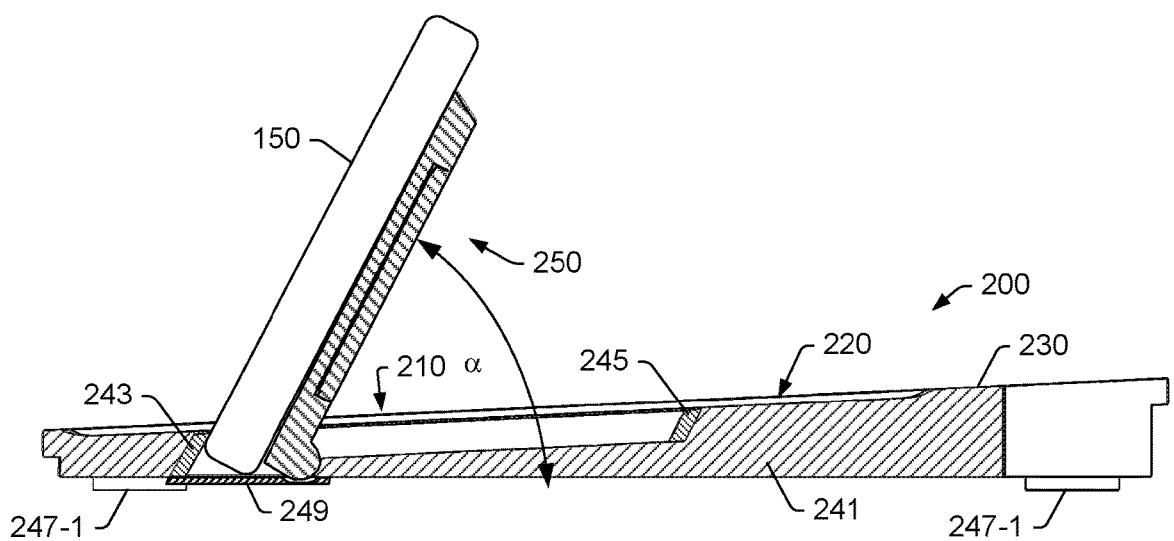
FIGS. 10A and 10B are cross-sectional views of examples of a base with a computing device.

FIG. 10A shows an example of the base 200 with the charger panel 250 positioned at an angle α, which may be measured with respect to the lower surface 201, a support surface, etc. As shown, the computing device 150 is supported at the angle α to be substantially flush against the front piece 280 of the charger panel 250. As an example, the computing device 150 may be supported at least in part by the bumper 243 and/or the bottom wall 249. Such support may help to position the computing device 150 in a manner whereby sufficient coil-to-coil overlap exists for purposes of charging (e.g., transferring energy from the base 200 to the computing device 150). As mentioned, an angle may be selected as a viewing angle, for example, as shown in FIG. 2.

Figure 10B:
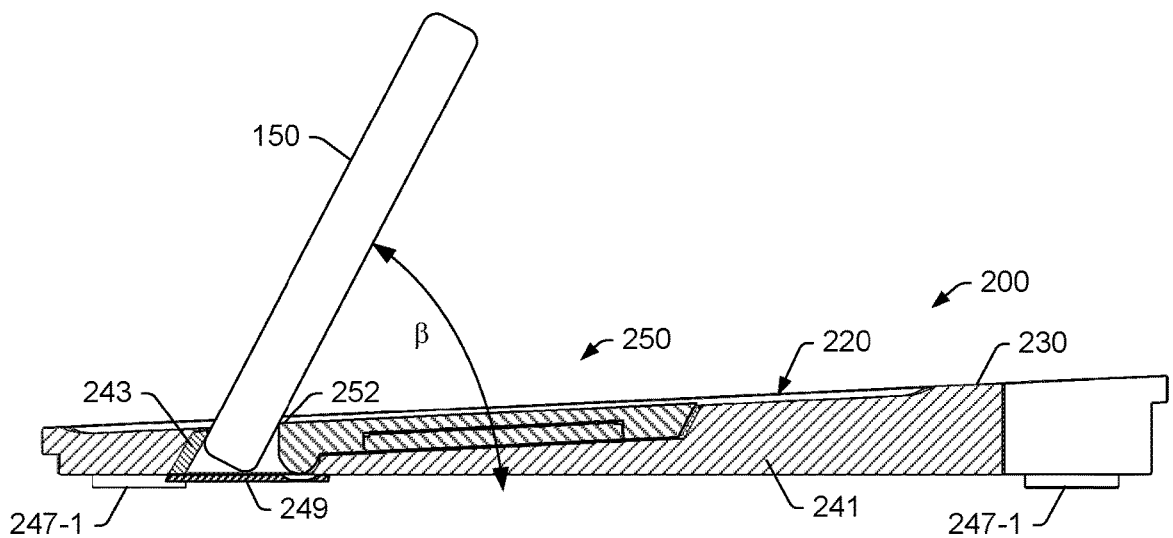

FIG. 10B shows an example of the base 200 with the charger panel 250 seated in the recess 210 where the computing device 150 is positioned at an angle β, which may be measured with respect to the lower surface 201, a support surface, etc. As shown, the computing device 150 is supported at the angle (3 via the gap that exists between the front edge 252 of the charger panel 250 and the bumper 243. As an example, the front edge 252 of the charger panel 250 may be constructed of a resilient material, which may be, for example, an elastomer. In the example of FIG. 10B, the computing device 150 is cantilevered.

Figure 11:
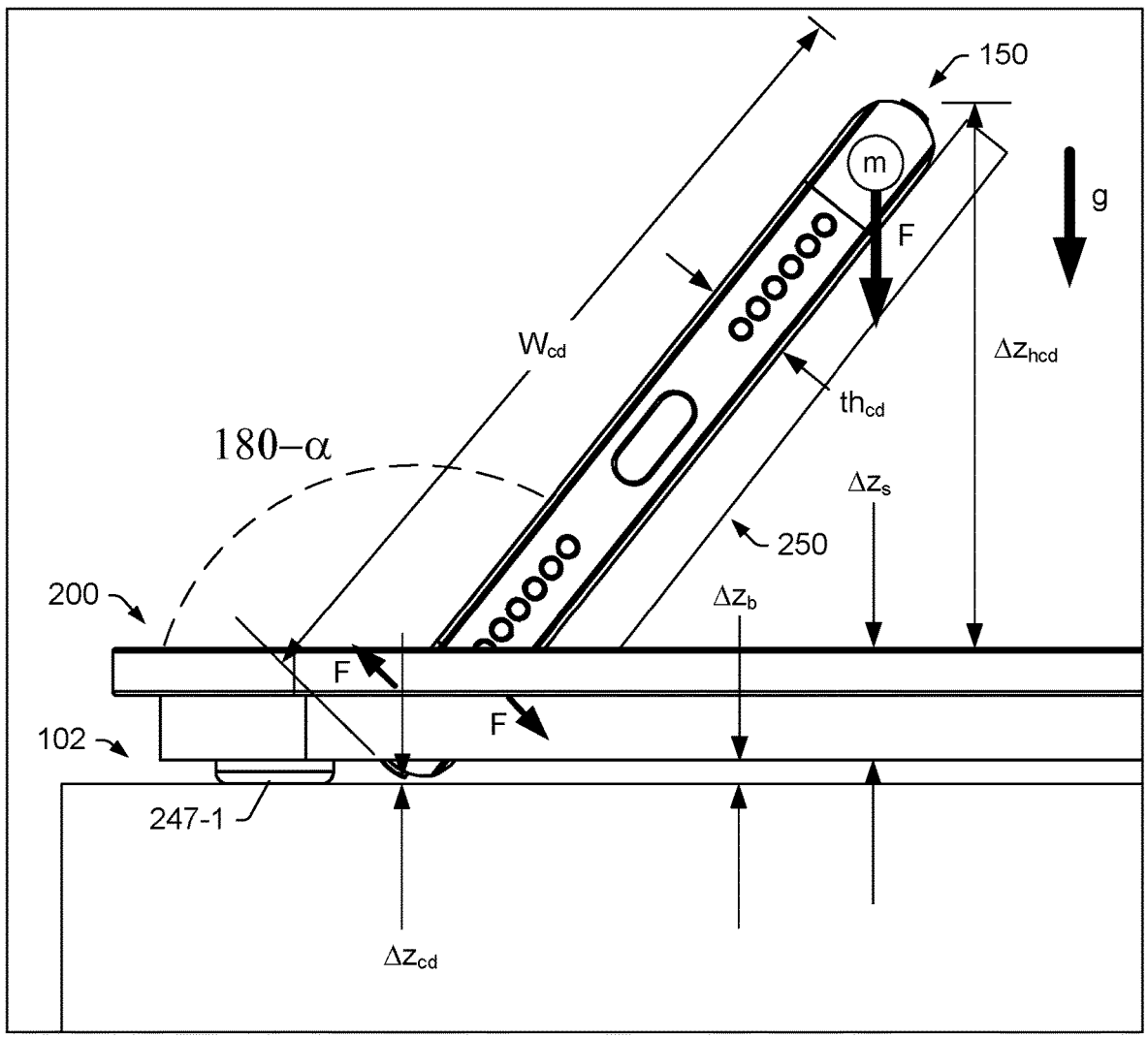
FIG. 11 is a side view of an example of a base with an example of a computing device.

FIG. 11 shows an example of the computing device 150 being supported by the charger panel 250. As shown, the base 200 is disposed on the support surface 102 where the computing device 150 is disposed at least in part in a gap (e.g., a slot), which is shown in the example of FIG. 11 to be a through-slot, for example, with an opening in the surface 222 of the base 200 and with an opening in the lower surface 201 of the base 130 (e.g., consider substantially parallel, opposing surfaces or opposing surfaces that may be at an angle such as the angle φ). In such an example, the surfaces 201 and 222 can define a slot height $\Delta z_s$. As shown in the example of FIG. 11, the computing device 150 does not contact the support surface 102; rather, there is a gap ($\Delta z_{cd}$) as defined at least in part by one or more features of the base 200 such as, for example, the foot 247-1; noting that there may be one or more additional feet or other structures that provide for a gap. As shown in the example of FIG. 11, the foot 247-1 can defined a base gap $\Delta z_b$, for example, between a lower surface of the foot 247-1 and the lower surface 201 of the base 200.

FIG. 11 shows various example of features the computing device 150, which can include one or more touch controls (e.g., control buttons, etc.), one or more connectors, one or more speakers, etc. As shown, one of the one or more connectors can be on a bottom edge and one or more of the one or more speakers can be on the bottom edge.

In the example shown in FIG. 11, the computing device 150 has a mass m, a width $W_{cd}$ and a thickness $th_{cd}$. FIG. 11 also shows an example of orientation of the computing device 150 and the base 200 with respect to acceleration of Earth's gravity (g). In the example shown, various forces can act upon the computing device 150 and the base 200 where forces can be applied to opposing walls of the gap (e.g., slot) as the computing device 150 is also in contact with the charger panel 250. Given the mass m and angle α, various forces may be calculated.

As to the orientation of FIG. 10B, FIG. 11 may be considered with the charger panel 250 being seated in the recess 210. In such an example, various forces can act upon the computing device 150 and the base 200 where forces can be applied to opposing walls of the gap as the computing device 150 is cantilevered, to form an overhanging portion includes a free end (e.g., bracing is achieved via the portion of the computing device 150 disposed in the gap). Given the mass m and angle α, various forces may be calculated.

As an example of a computing device, consider the following specifications 151 mm×76 mm×8.3 mm (L×W×th) that has a mass of approximately 200 grams (e.g., approximately 7 ounces). In such an example, the opening 211 in the base 200 can be longer than 151 mm and include a gap (see, e.g., $\Delta y_g$ in FIG. 5) that is wider than 8.3 mm. As an example, as shown in FIG. 1, the base 200 can be a base of a computing device 100, which may be an all-in-one (AIO) type of computing device or, for example, the base 200 can be a base of a display device.

As an example, a gap such as the gap 219 can include a width that is in a range from approximately 5 mm to 20 mm, in a range from approximately 8 mm to approximately 15 mm, or in a range from approximately 10 mm to approximately 12 mm. As an example, consider a gap with a width of approximately 11.5 mm. In such examples, the width may be a minimum width of the gap, which may be closer to the top of the gap (e.g., the surface 222) than the bottom of the gap (e.g., the surface 201).

As an example, a gap such as the gap 219 can include a length that is in a range from approximately 50 mm to 300 mm, in a range from approximately 75 mm to approximately 250 mm, or in a range from approximately 100 mm to approximately 200 mm. As an example, consider a slot with a width of approximately 172 mm.

As an example, a gap can be configured to support a smartphone such as, for example, an PHONE® smartphone, a MOTO® smartphone, a SAMSUNG® smartphone, etc.

As an example, a gap may include an open end that extends to a side of a base. In such an example, the gap length may be measured from the side of the base inwardly. As an example, where a gap has an open end, a computing device may be positioned in the gap with a portion of the computing device extending beyond the side of the base.

As shown in the example of FIG. 11, the computing device 150 can be supported at an angle α of the charger panel 250 of the base 130 without being in contact with a lower support surface. As an example, the bottom wall 249 may be utilized for support (e.g., to define a bottom of the gap 219).

Figure 12:
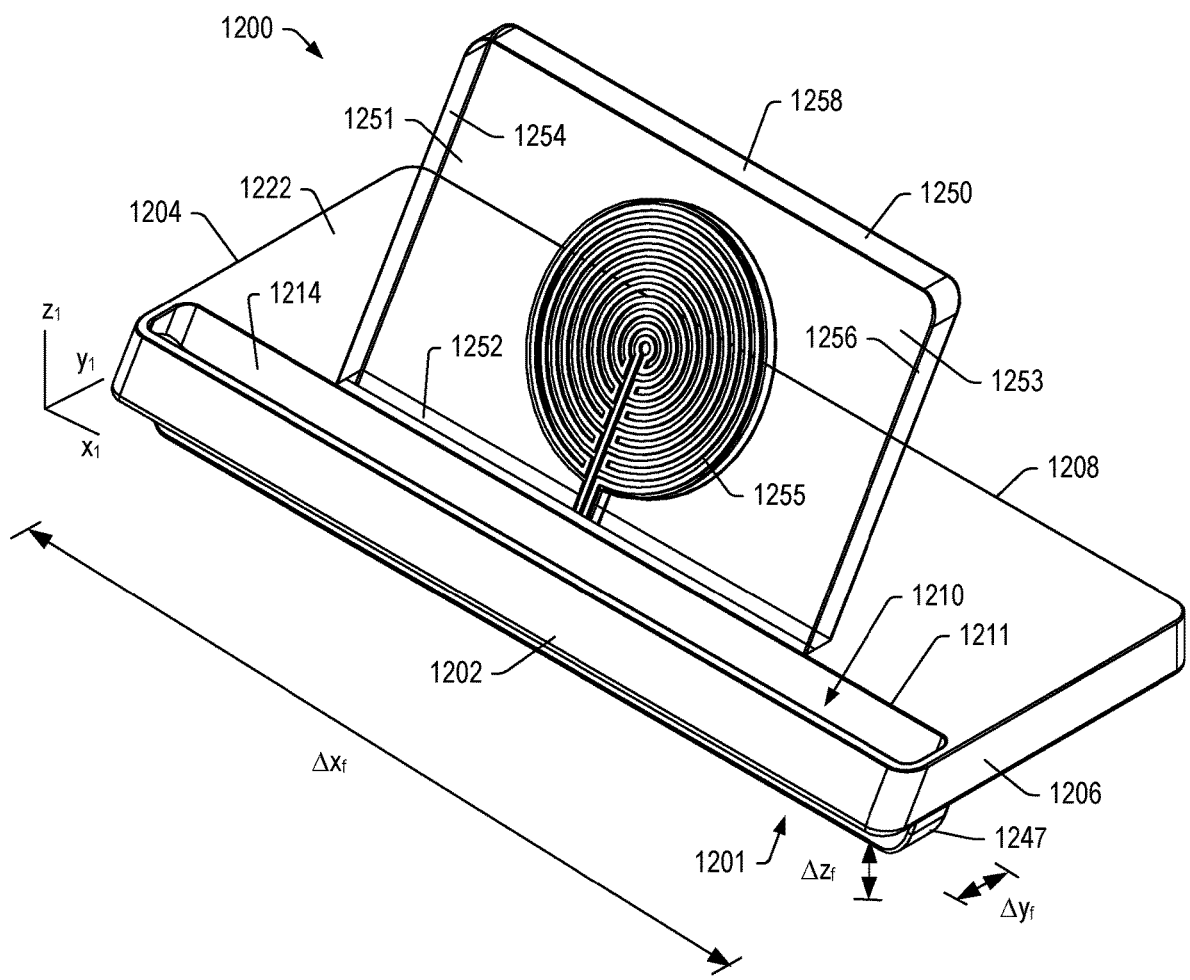
FIG. 12 is a perspective view of an example of a base.

FIG. 12 shows an example of a base 1200 that includes a charger panel 1250. As an example, the base 1200 can be portable, optionally with the charger panel 1250 in a storable state. For example, the base 1200 can include a recess that can provide for storage of the charger panel 1250 where the recess may be a fold-in recess, a slide-in recess, etc.

In the example of FIG. 12, the base 1200 includes a lower surface 1201 and an upper surface 1222 along with a front edge 1202, opposing sides 1204 and 1206 and a back edge 1208. As shown, the charger panel 1250 includes a front surface 1251 (e.g., a front side), a front edge 1252 (e.g., a bottom edge), a back surface 1253 (e.g., a back side), opposing sides 1254 and 1256 and a back edge 1258 (e.g., a top edge). The charger panel 1250 is shown as being made of transparent material such that circuitry 1255 is visible.

In the example of FIG. 12, a recess 1210 is positioned in front of the charger panel 1250 with an opening 1211 in the upper surface 1222 and a wall 1214 (e.g., a side wall). In such an example, a computing device such as the computing device 150 may be fit in part into the recess 1210 such that circuitry thereof can be electromagnetically coupled with the circuitry 1255 of the charger panel 1250. As an example, the recess 1210 can be dimensioned as explained with respect to a gap such as, for example, the gap 219 of the base 200.

In the example of FIG. 12, the base 1200 can include one or more feet 1247. For example, the one or more feet 1247 can support at least a portion of the base 1200 on a support surface such that the surface 1222 may be at an angle.

In FIG. 12, the one or more feet 1247 can define a foot or feet length dimension $\Delta x_f$, as well as one or more dimensions along directions in the $y_1$ and $z_1$ axes (see, e.g., $\Delta y_f$ and $\Delta z_f$). As an example, the one or more feet 1247 can be configured for receipt by a gap, such as a gap with dimensions for receipt of at least a portion of a smartphone, etc. As an example, a base can include a slot with such dimensions where the one or more feet 1247 can be received at least in part or wholly within the slot. In such an example, the slot of the base is occupied by the one or more feet 1247 of the base 1200 such that the slot of the base is not available to receive a portion of a smartphone (e.g., to support the smartphone at a suitable angle). However, the recess 1210, which may be referred to as a slot, is now available to receive a portion of such a smartphone. In such an example, the base 1200 can be an accessory that is configured to be utilized with another base, for example, to provide charging functionality to a base that may not include such charging functionality.

Figure 15A:
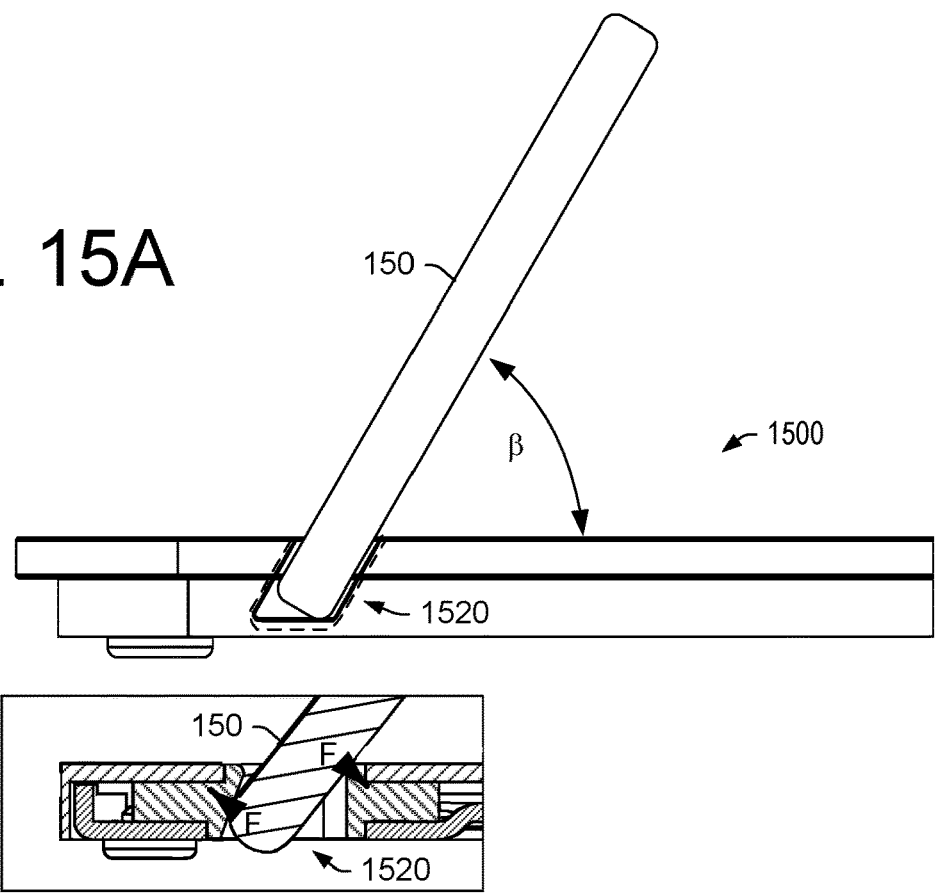
FIGS. 15A and 15B are side views of examples of a base and bases, respectively.
Figure 15B:
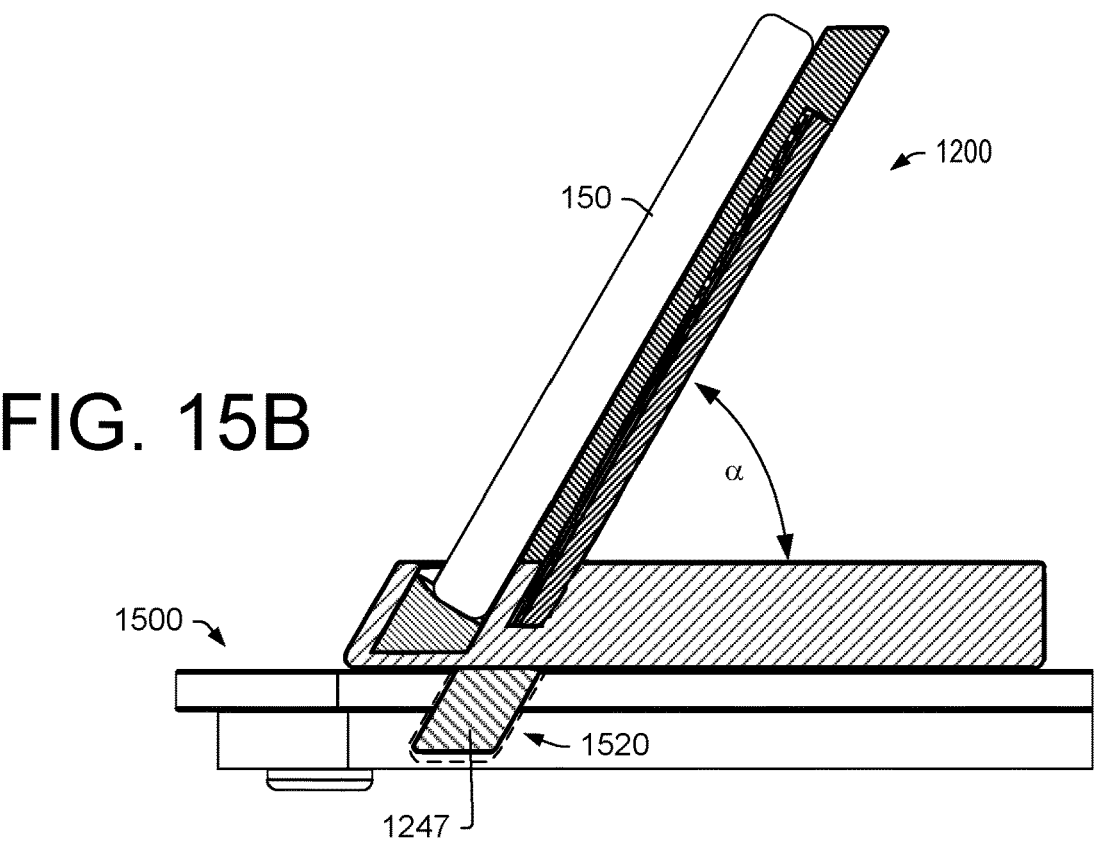

As explained with respect to FIG. 15A and FIG. 15B, the one or more feet 1247 can be utilized to secure the base 1200 in a slot of another base. For example, consider a base of a stand that can support a display device where the slot can be configured to support a computing device such as the computing device 150 at an angle. Where the base of the stand does not include charging circuitry, the base 1200 can be an accessory that is matched to the base of the stand where the one or more feet 1247 (e.g., a foot) can be inserted into the slot of the base of the stand and where the base 1200 replicates the slot (e.g., approximately replicates its ability to support a mobile device, etc.) such that the user can position a mobile device and charge the mobile device.

Figure 13:
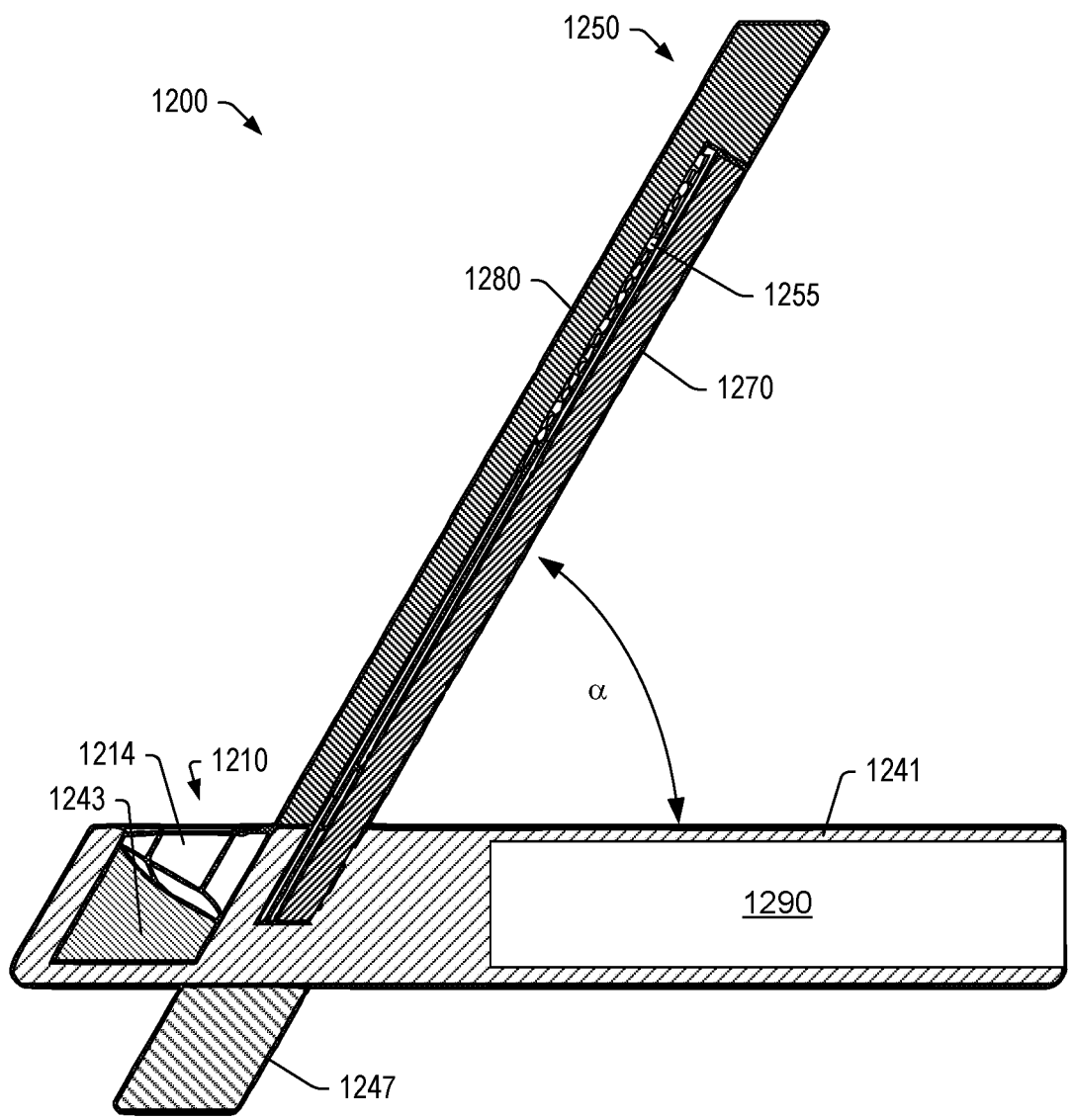
FIG. 13 is an approximate cross-sectional view of the base of FIG. 12.

FIG. 13 shows a cross-sectional view of the base 1200 where the base 1200 includes a body 1241, an optional bumper 1243 that can be at a bottom and/or a side of the recess 1210, a back piece 1270, a front piece 1280, and circuitry 1290. As shown, the circuitry 1255 includes a coil or coils disposed between the front piece 1280 and the back piece 1270. As shown in FIG. 12, the coil or coils can be visible where at least the front piece 1280 is see-through (e.g., transparent). As to the bumper 1243, it may be made of an elastomer that can cushion a side of a computing device that is fit at least in part into the recess 1210.

As to the circuitry 1290, it can be operatively coupled to the circuitry 1255. For example, consider the example of FIG. 3 where the base 520 includes various components, units, etc. As an example, the base 1200 can include one or more features of the base 520 such that the base 1200 can operate as a charger via the circuitry 1255.

Figure 14:
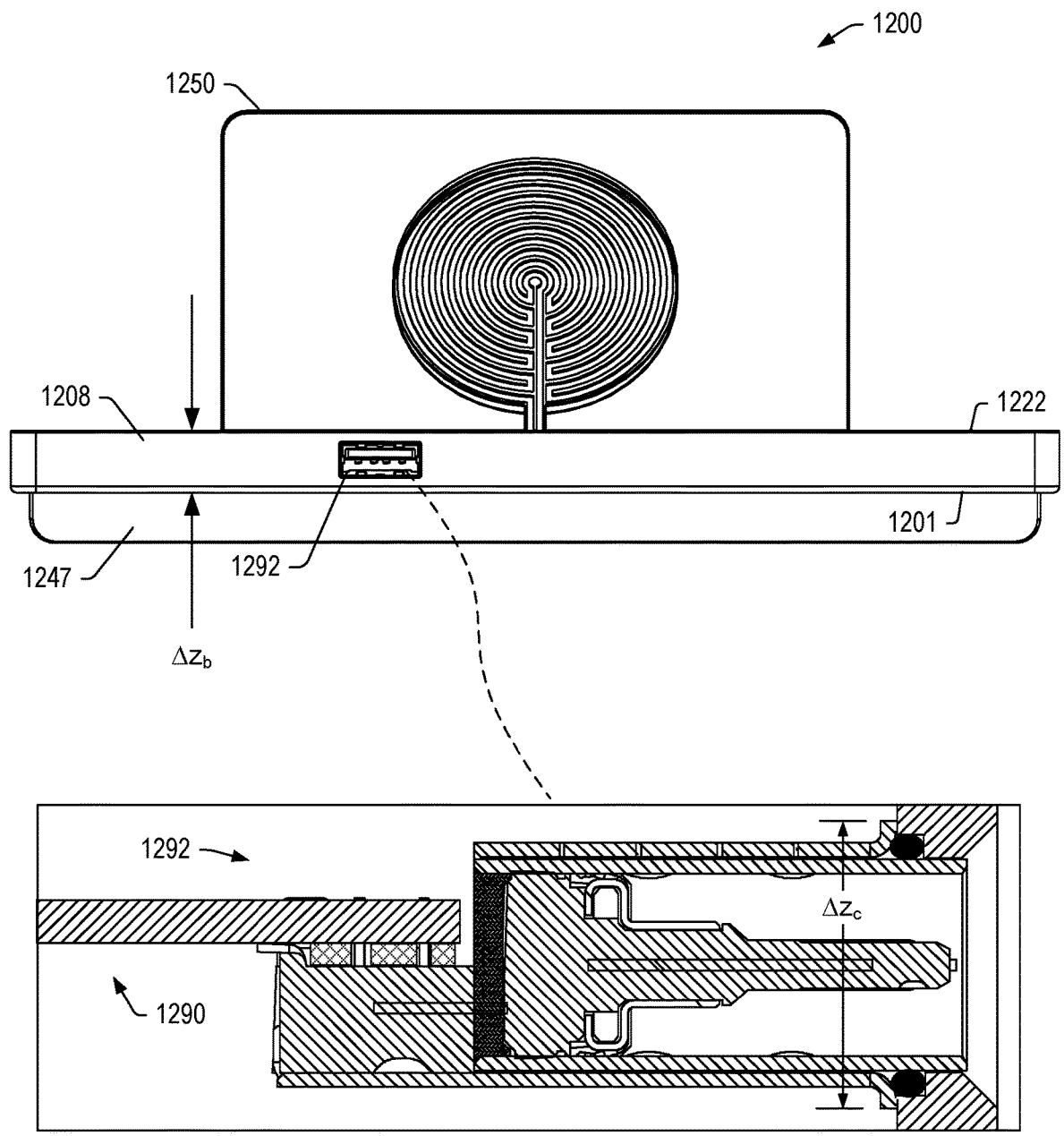
FIG. 14 is a back view of the base of FIG. 12 with a cross-sectional view of an example of a connector.

FIG. 14 shows a back view of the base 1200 where a connector 1292 is present at the back edge 1208 between the lower surface 1201 and the upper surface 1222, which can define a thickness of the base 1200 (e.g., without the foot 1247). As shown, the thickness can be defined by a dimension $\Delta z_b$ and the connector 1292 can be defined by a thickness (e.g., or height) $\Delta z_c$. As shown, the thickness of the base 1200 at the back edge 1208 is less than twice the thickness of the connector 1292. Such an approach can provide for a slim portion of the base 1200. Where the base 1200 includes a recess for storing the charger panel 1250, the connector 1292 may be positioned offset from that storage recess such that the base 1200 can remain relatively slim.

In the example of FIG. 14, the connector 1292 can be a serial bus connector that can be a female connector configured to receive a male plug. For example, consider USB specification connector (e.g., 2.0, 3.0, etc.). In the example of FIG. 14, the base 1200 may be supplied with power via the connector 1292. For example, the circuitry 1290 can include supply circuitry that can condition power received via the connector 1292 for purposes of charging such that the base 1200 is a wireless charger base; noting that a cable can include a connector that can plug into the connector 1292 for supplying power (e.g., wireless can refer to coil-to-coil transmission of power inductively). As an example, where the base 1200 includes a battery or batteries, power may be stored in the base 1200 such that cordless or cable-less operation may occur for wireless charging of a device (e.g., coil-to-coil).

FIG. 15A shows an approximate cross-sectional view of an example of a base 1500 that includes a slot 1520 that can be utilized to position the computing device 150 at an angle β where an inset shows a more detailed cross-sectional view of a portion of an example of the base 1500 along with force arrows labeled "F". As explained, the base 1200 can be utilized with a base such as the base 1500. For example, the base 1200 can be seated with respect to the slot 1520 of the base 1500.

FIG. 15B shows the base 1200 seated with respect to the base 1500 with the foot 1247 (e.g., one or more feet) disposed at least in part in the slot 1520 of the base 1500. As shown, the computing device 150 can be seated at least in part in the recess 1210 of the base 1200 and against a surface, which may be a surface of a bumper. In the example of FIG. 15B, the bases 1200 and 1500 can be referred to as stacked bases. As mentioned, the base 1200 can replicate one or more features (e.g., functionally) of the base 1500 where the base 1200 can utilize a feature or features of the base 1500 for purposes of stacking. As shown, when stacked, the base 1200 can be secure such that it does not move with respect to the base 1500 when a user positions a device with respect to the base 1200 for purposes of charging, etc.

As explained, the one or more feet 1247 can be utilized for one or more purposes. For example, the base 1200 can be a stand-alone base with support via the one or more feet 1247 and the base 1200 can be stacked using the one or more feet 1247. As an example, the one or more feet 1247 can include a connector or connectors where a base such as the base 1500 can include one or more matching connectors such that the base 1200 can electrically couple to the base 1500. In such an example, the base 1200 may be supplied power via the connectors being coupled and/or via the connector 1292, as shown being on the back edge 1208 of the base 1200; noting that the connector 1292 may be positioned elsewhere on the base 1200.

As explained, the base 1200 can be coupled to a cable via a connector such that power is supplied to the base 1200 where the computing device 150 can be without a cable connected thereto where power is transferred to the computing device 150 from a coil of the base 1200 to a coil of the computing device 150, for example, as explained with respect to the example system 500 of FIG. 3.

As mentioned, the base 1200 can be of a thickness that is minimal such that it has a low profile when arranged as shown in the example of FIG. 15B. For example, the base 1200 can be less than twice the height of a USB female connector assembly, which can be of a sufficient thickness to provide a depth to the recess 1210 for securely positioning a mobile device such as the computing device 150. As explained, where a user has a stand without charging capabilities, the base 1200 can be an accessory that can sleekly fit to the stand (e.g., a base thereof) without taking away functionality of a slot thereof.

As to some examples of a base with a slot, a U.S. patent application having Ser. No. 16/675,975, filed 6 Nov. 2019, is incorporated herein by reference, which is entitled "Slotted base display device".

Figure 16:
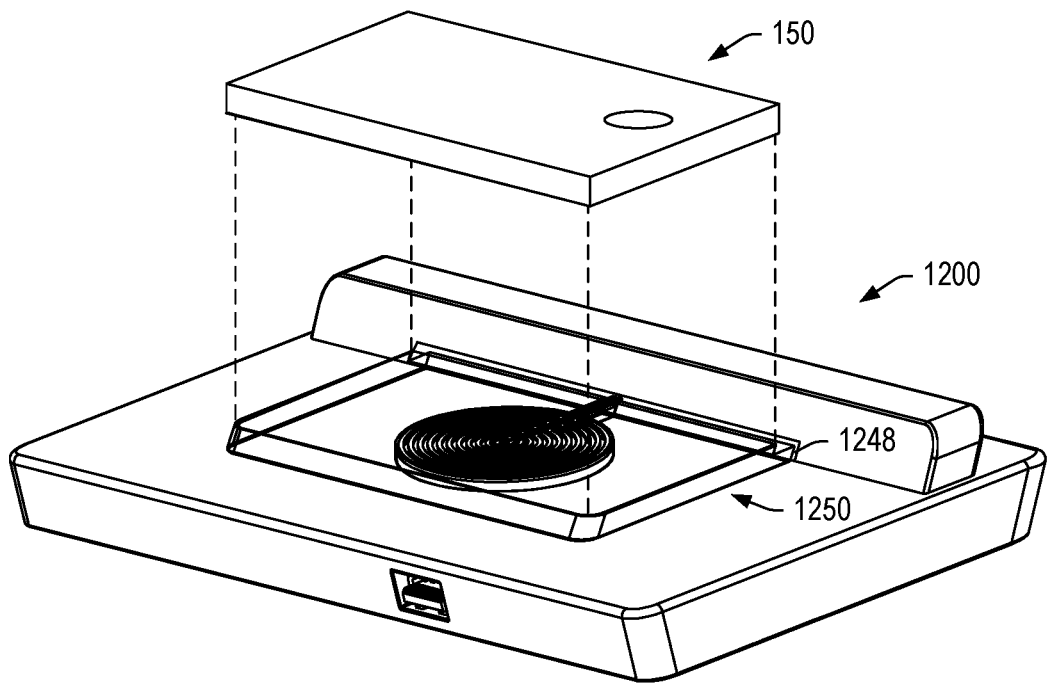
FIG. 16 is a perspective view of an example of a base.

FIG. 16 shows an example of the base 1200 with a slot 1248 in the foot 1247 that can seat the charger panel 1250, for example, in a storage state (e.g., a storage orientation). Additionally, or alternatively, the slot 1248 can include contacts for electronically coupling the circuitry 1255 of the charger panel 1250 to circuitry such as the circuitry 1290 of the base 1200. In such an example, the computing device 150 or another device may be positioned on the charger panel 1250 for purposes of charging (e.g., transmission and reception of power from the base 1200 to a device). In the example of FIG. 16, the foot 1247 may be utilized to facilitate suitable alignment of a coil to another coil for purposes of charging.

As an example, the base 1200 can include a groove or other feature, which may, for example, be suitable for seating a stylus, which may be a stylus that can be charged by the base 1200. For example, the surface 1222 can include a groove, etc., for seating a stylus, the foot 1247 can include a groove, etc., for seating the stylus, etc.

As to an example, a base can include a material selected such that it does not mark or otherwise damage a computing device (e.g., a display surface, a glass surface, a polished metal surface, etc.). As an example, a material can be a polymeric material. As an example, a material can be an elastomeric material. As an example, a material can be a rubber (e.g., natural and/or synthetic rubber). As an example, a material can be co-molded with one or more other pieces of a base, which may be a base of a stand that supports a display, an all-in-one (AIO) computing device, etc. As an example, material can be co-molded with a plastic such as a thermoplastic polymeric material (e.g., acrylonitrile butadiene styrene (ABS)). As an example, material can be a thermoplastic polymeric material such as, for example, ABS. As an example, material can be a material that is softer than ABS such that a user may view material as being gentle to accommodate a computing device such as a smartphone without risk of damage to the computing device. For example, material may have a Shore D hardness that is less than approximately 75 (e.g., less than approximately Shore D 75, less than approximately Shore D 50, less than approximately Shore A 70, less than approximately Shore A 40, less than approximately Shore A 20, or less than approximately Shore 00 50. A material can have a hardness greater than approximately Shore 00 10, which may, for example, be considered a lower value of one or more ranges. As an example, a rubber may be a medium soft rubber such as that of a pencil eraser, which may have a Shore A harness of approximately 40 and a Shore 00 hardness of approximately 80.

As an example, a base can include a structural chassis that may be made of metal or metallic alloy. As an example, a base can include a cover or shell that may be made of a polymeric material. As an example, finish material may be a polymeric material, a metal, a metallic alloy, etc.

As explained, a charging device can include a base that includes power transmission circuitry, a charger panel and a coil operatively coupled to the power transmission circuitry, where the charger panel includes a transparent material, and where the coil is visible via the transparent material. For example, the base 200 can include the charger panel 250 with at least the front piece 280 being transparent for viewing of a coil of the charger panel 250 and, for example, the base 1200 can include the charger panel 1250 with at least the front piece 1280 being transparent for viewing of a coil of the charger panel 1250.

As an example, a base can include tilt function of a charger panel for charging a phone or other accessory where the base can be a display base (e.g., a stand for a display device, etc.). As an example, a tilt function can be via one or more mechanisms such as, for example, pivoting about an axis. In such an example, a charger panel can be oriented to allow a user to view a display of a phone, etc., from a user friendly viewing angle, while also being able to charge the phone.

As an example, a base can include an opening to a recess that includes various features that are geometrically arranged to support a phone such as a smartphone at least in part in the recess. As mentioned, one or more materials of construction of a wall that defines at least part of a recess can be selected to be compatible with a phone such that damage such as scratching does not occur.

As to material of construction of a charger panel, as mentioned, glass, polymeric material, etc., may be utilized where such material can be transparent. As to a polymeric material, as an example, an acrylic material may be utilized.

As mentioned, a base can be a USB type of device that can receive power via a cable with a USB connector. While a USB type of connector is mentioned, one or more other types of power connectors may be utilized, for example, a connector with a specification that can be for power or power and data.

As explained with respect to FIG. 10A and FIG. 10B, as well as FIG. 11, a computing device can be supported at an angle in a gap (e.g., a recess, etc.) when a charger panel is in a recessed state or storage state. In such an example, a front edge of the charger panel can provide a surface that can be utilized to wedge a computing device such as a smartphone. Where a user desires to use the charger panel for charging the smartphone, the user may position the charger panel accordingly, for example, by removing the smartphone, moving the charger panel and repositioning the smartphone such that sufficient alignment exists between charging coils.

As an example, a base can be a USB powered device that can be a charging device. As an example, a base can have a USB power cabled internally inside an arm up to display device head or, for example, by a USB connector (e.g., USB port), etc. While USB is mentioned, one or more other types of connectors, wirings, etc., may be utilized to supply power to circuitry of a base.

As an example, a charging device can include a base that includes power transmission circuitry, a charger panel and a coil operatively coupled to the power transmission circuitry, where the charger panel includes a transparent material, and where the coil is visible via the transparent material. In such an example, the charger panel can be positionable with respect to a surface of the base. In such an example, a finger recess can be included contacting the charger panel for positioning the charger panel (e.g., a finger recess in the base, in the charger panel, in the charger panel and in the base, etc.).

As an example, a charging device can include a charger panel that is pivotable from a first angle with respect to a surface of the base to a second angle with respect to the surface of the base.

As an example, a base can include a recess that seats a charger panel in a first orientation and a spring-biased pop out adjuster that responds to pressure to transition the charger panel from the first orientation to a second orientation. In such an example, a latch, a lock, etc., may be included.

As an example, a charging device can include an arm that extends from a base, where the arm includes a coupling for coupling of a display device to the arm. In such an example, the display device can include a processor and memory accessible to the processor. In such an example, the display device may be an all-in-one (AIO) computer.

As an example, a charging device can include a base that includes a connector for supply of electrical power to the base, where the power transmission circuitry is operatively coupled to the connector. In such an example, the base can include an arm that extends from the base and that is operatively coupled to a display device, where the display device is supportable on a support surface by the base, and where the base is electrically coupled to the display device for supply of electrical power to the power transmission circuitry.

As an example, a base can include a foot (e.g., or feet) for receipt by a slot of another base for stacking the base and the other base. For example, consider a stacked base arrangement where an upper base stacked on a lower base provides for charging circuitry. In such an example, the lower base may be without wireless charging circuitry and the upper base may provide wireless charging circuitry.

As an example, a charging device can include a charger panel with transparent material that is or includes glass and/or that is or includes a polymeric material.

As an example, a charging device can include a base that includes a surface that includes an opening, where the opening has a length that is greater than approximately 50 mm and less than approximately 300 mm. Such an opening may be a gap or a slot and may include a bottom or be bottomless. As an example, an opening can be disposed between a front surface of a charger panel (e.g., or a front edge of a charger panel) and a front edge of a base. In such an example, the charger panel can include a back surface where the back surface is disposed at an angle with respect to the surface of the base that includes the opening. In such an example, the angle can be greater than approximately 10 degrees and less than approximately 110 degrees (e.g., or less than approximately 95 degrees).

As an example, a charging device can include at least one joint between a charger panel and a base. For example, consider at least one joint that includes at least one friction joint.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 17:
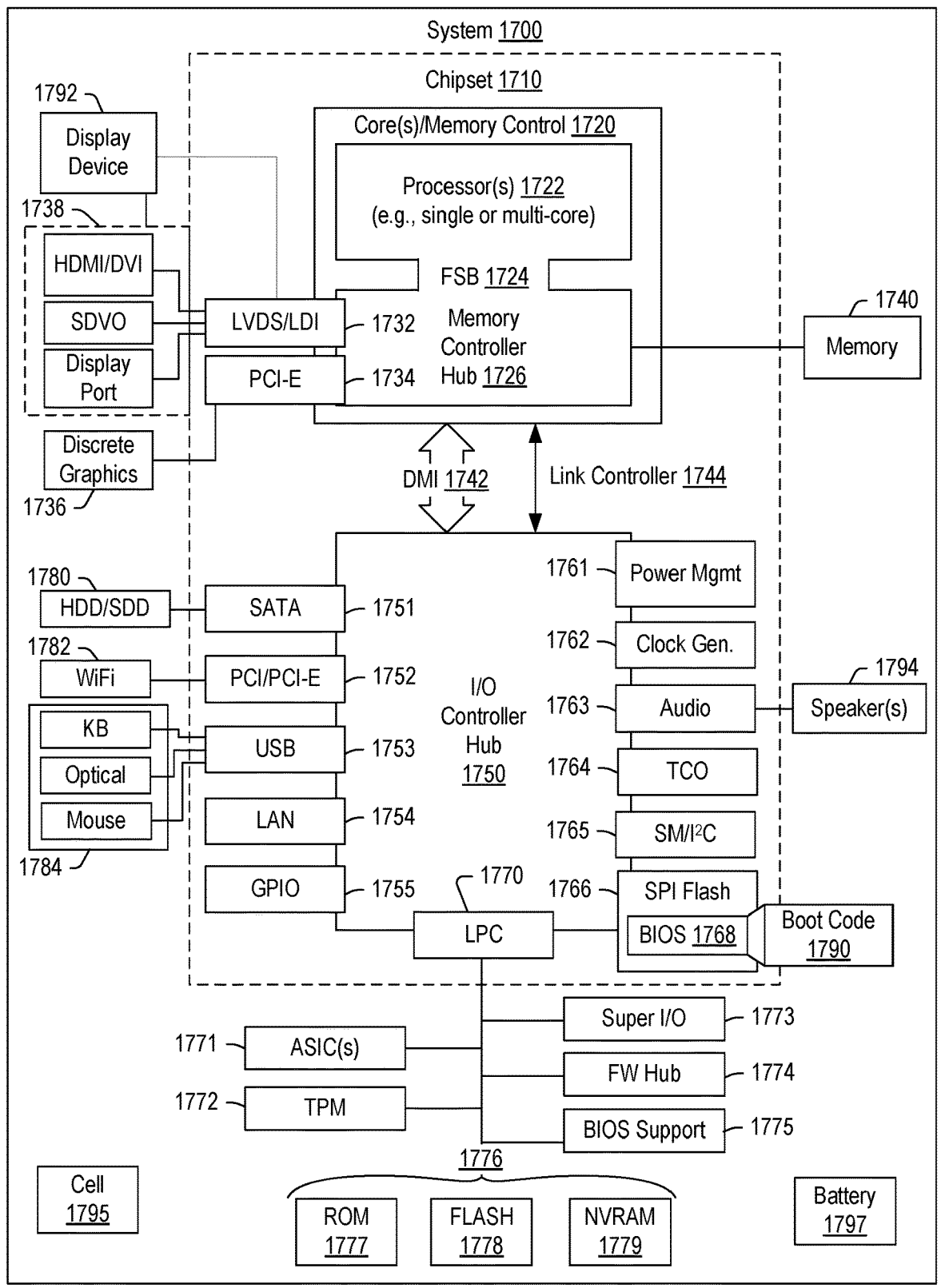
FIG. 17 is a diagram of an example of a system.

While various examples of circuits or circuitry have been discussed, FIG. 17 depicts a block diagram of an illustrative computer system 1700. The system 1700 may be a computer system sold by Lenovo (US) Inc. of Morrisville, NC (e.g., a THINKSTATION® system, etc.); however, as apparent from the description herein, a satellite, a base, a display, a computing device, a server or other machine may include one or more features and/or other features of the system 1700.

As an example, a monitor or display may include features such as one or more of the features included in one of the LENOVO® IDEACENTRE® or THINKCENTRE® "all-in-one" (AIO) computing devices (e.g., sold by Lenovo (US) Inc. of Morrisville, NC). For example, the LENOVO® IDEACENTRE® A720 computing device includes an Intel® Core i7 processor, a 27 inch frameless multi-touch display (e.g., for HD resolution of 1920×1080), a NVIDIA® GeForce® GT 630M 2 GB graphics card, 8 GB DDR3 memory, a hard drive, a DVD reader/writer, integrated Bluetooth® and 802.11b/g/n Wi-Fi®, USB connectors, a 6-in-1 card reader, a webcam, HDMI in/out, speakers, and a TV tuner.

As shown in FIG. 17, the system 1700 includes a so-called chipset 1710. A chipset refers to a group of integrated circuits, or chips, that are designed to work together. Chipsets are usually marketed as a single product (e.g., consider chipsets marketed under the brands INTEL®, AMD®, etc.).

In the example of FIG. 17, the chipset 1710 has a particular architecture, which may vary to some extent depending on brand or manufacturer. The architecture of the chipset 1710 includes a core and memory control group 1720 and an I/O controller hub 1750 that exchange information (e.g., data, signals, commands, etc.) via, for example, a direct management interface or direct media interface (DMI) 1742 or a link controller 1744. In the example of FIG. 17, the DMI 1742 is a chip-to-chip interface (sometimes referred to as being a link between a "northbridge" and a "southbridge").

The core and memory control group 1720 include one or more processors 1722 (e.g., single core or multi-core) and a memory controller hub 1726 that exchange information via a front side bus (FSB) 1724. As described herein, various components of the core and memory control group 1720 may be integrated onto a single processor die, for example, to make a chip that supplants the conventional "northbridge" style architecture.

The memory controller hub 1726 interfaces with memory 1740. For example, the memory controller hub 1726 may provide support for DDR SDRAM memory (e.g., DDR, DDR2, DDR3, etc.). In general, the memory 1740 is a type of random-access memory (RAM). It is often referred to as "system memory".

The memory controller hub 1726 further includes a low-voltage differential signaling interface (LVDS) 1732. The LVDS 1732 may be a so-called LVDS Display Interface (LDI) for support of a display device 1792 (e.g., a CRT, a flat panel, a projector, etc.). A block 1738 includes some examples of technologies that may be supported via the LVDS interface 1732 (e.g., serial digital video, HDMI/DVI, display port). The memory controller hub 1726 also includes one or more PCI-express interfaces (PCI-E) 1734, for example, for support of discrete graphics 1736. Discrete graphics using a PCI-E interface has become an alternative approach to an accelerated graphics port (AGP). For example, the memory controller hub 1726 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1750 includes a variety of interfaces. The example of FIG. 17 includes a SATA interface 1751, one or more PCI-E interfaces 1752 (optionally one or more legacy PCI interfaces), one or more USB interfaces 1753, a LAN interface 1754 (more generally a network interface), a general purpose I/O interface (GPIO) 1755, a low-pin count (LPC) interface 1770, a power management interface 1761, a clock generator interface 1762, an audio interface 1763 (e.g., for speakers 1794), a total cost of operation (TCO) interface 1764, a system management bus interface (e.g., a multi-master serial computer bus interface) 1765, and a serial peripheral flash memory/controller interface (SPI Flash) 1766, which, in the example of FIG. 17, includes BIOS 1768 and boot code 1790. With respect to network connections, the I/O hub controller 1750 may include integrated gigabit Ethernet controller lines multiplexed with a PCI-E interface port. Other network features may operate independent of a PCI-E interface.

The interfaces of the I/O hub controller 1750 provide for communication with various devices, networks, etc. For example, the SATA interface 1751 provides for reading, writing or reading and writing information on one or more drives 1780 such as HDDs, SDDs or a combination thereof. The I/O hub controller 1750 may also include an advanced host controller interface (AHCI) to support one or more drives 1780. The PCI-E interface 1752 allows for wireless connections 1782 to devices, networks, etc. The USB interface 1753 provides for input devices 1784 such as keyboards (KB), one or more optical sensors, mice and various other devices (e.g., microphones, cameras, phones, storage, media players, etc.). On or more other types of sensors may optionally rely on the USB interface 1753 or another interface (e.g., I²C, etc.). As to microphones, the system 1700 of FIG. 17 may include hardware (e.g., audio card) appropriately configured for receipt of sound (e.g., user voice, ambient sound, etc.).

In the example of FIG. 17, the LPC interface 1770 provides for use of one or more ASICs 1771, a trusted platform module (TPM) 1772, a super I/O 1773, a firmware hub 1774, BIOS support 1775 as well as various types of memory 1776 such as ROM 1777, Flash 1778, and non-volatile RAM (NVRAM) 1779. With respect to the TPM 1772, this module may be in the form of a chip that can be used to authenticate software and hardware devices. For example, a TPM may be capable of performing platform authentication and may be used to verify that a system seeking access is the expected system.

The system 1700, upon power on, may be configured to execute boot code 1790 for the BIOS 1768, as stored within the SPI Flash 1766, and thereafter processes data under the control of one or more operating systems and application software (e.g., stored in system memory 1740). An operating system may be stored in any of a variety of locations and accessed, for example, according to instructions of the BIOS 1768. Again, as described herein, a satellite, a base, a server or other machine may include fewer or more features than shown in the system 1700 of FIG. 17. Further, the system 1700 of FIG. 17 is shown as optionally include cell phone circuitry 1795, which may include GSM, CDMA, etc., types of circuitry configured for coordinated operation with one or more of the other features of the system 1700.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A charging device comprising: a base that comprises a front edge, opposing sides, a back edge, an upper surface, a lower surface, at least one charger panel slot, a wireless power transmission circuitry, a charger panel, a charger panel coil operatively coupled to the wireless power transmission circuitry, and a foot that extends outwardly from the lower surface, wherein the at least one charger panel slot comprises an upper surface charger panel slot for the charger panel, wherein the at least one charger panel slot further comprises a foot charger panel slot for the charger panel, wherein the charger panel coil operatively coupled to the wireless power transmission circuitry is operative with the charger panel coupled to the upper surface charger panel slot and with the charger panel coupled to the foot charger panel slot, and wherein, for the charger panel coupled to the foot charger panel slot, the base is supportable on a support surface by the upper surface.

2. The charging device of claim 1, wherein the foot is positioned closer to the front edge than the back edge to support the base on a horizontal support surface such that the upper surface is not parallel to the horizontal support surface.

3. The charging device of claim 1, wherein, for the charger panel coupled to the upper surface charger panel slot, the base is supportable on a support surface by at least the foot.

4. The charging device of claim 1, comprising a mobile device recess in the upper surface, wherein the mobile device recess is positioned between the upper surface charger panel slot and the front edge.

5. The charging device of claim 4, wherein the charger panel is coupled to the base via the upper surface charger panel slot and wherein a front surface of the charger panel is aligned with a back edge of the mobile device recess.

6. The charging device of claim 4, wherein the mobile device recess comprises a bottom surface formed by an elastomeric material.

7. The charging device of claim 5, wherein a back surface of the charger panel and the upper surface define an acute angle.

8. The charging device of claim 1, comprising a serial transmission port.

9. The charging device of claim 8, wherein the serial transmission port is disposed on the front edge of the base.

10. The charging device of claim 8, wherein the serial transmission port is disposed on the back edge of the base.

11. The charging device of claim 1, wherein the base comprises a thickness defined between the upper surface and the lower surface and wherein the foot comprises a foot height that is approximately equal to the thickness of the base.

12. A system comprising: a first base that comprises a slot; and a second base that comprises a wireless power transmission circuitry, a charger panel, and a charger panel coil operatively coupled to the wireless power transmission circuitry, wherein the second base comprises a multi-function foot that comprises a first function for supporting the second base on a support surface and an alternative second function wherein the multi-function foot is received by the slot of the first base for stacking and supporting the second base on the first base, wherein the slot of the first base receives the multi-function foot or a mobile device, and wherein a mobile device recess of the second base receives the mobile device to position the mobile device with respect to the charger panel coil.

13. The system of claim 12, wherein the multi-function foot comprises an alternative third function wherein the multi-function foot comprises a charger panel slot for coupling of the charger panel to the foot.

14. The system of claim 13, wherein, for the third function, the multi-function foot provides a guide surface for positioning of a mobile device with respect to the charger panel.

15. The system of claim 12, wherein the slot comprises a width that is in a range from approximately 5 mm to 20 mm and a length that is in a range from approximately 50 mm to 300 mm.

16. The charging device of claim 1, wherein the foot comprises an end surface and a side surface, and wherein the foot charger panel slot is disposed in the side surface.

17. The charging device of claim 16, wherein the base is supportable on a support surface by the end surface of the foot and by the lower surface at a position of the lower surface that is between the foot and the back edge of the base.

18. The system of claim 13, wherein the multi-function foot comprises an end surface and a side surface, and wherein the charger panel slot is disposed in the side surface.

* * * * *